United States Patent
Singh et al.

(10) Patent No.: US 12,547,939 B2
(45) Date of Patent: Feb. 10, 2026

(54) SYSTEM AND A METHOD FOR PERFORMING A PRIVACY-PRESERVING DISTRIBUTION SIMILARITY TESTS BETWEEN A PLURALITY OF DATASETS

(71) Applicant: Huawei Cloud Computing Technologies Co., Ltd., Guizhou (CN)

(72) Inventors: Gursimran Singh, Delta (CA); Chirong Zhang, Burnaby (CA); Yong Zhang, Richmond (CA)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 556 days.

(21) Appl. No.: 18/160,367

(22) Filed: Jan. 27, 2023

(65) Prior Publication Data
US 2024/0296377 A1 Sep. 5, 2024

(51) Int. Cl.
*G06N 20/00* (2019.01)
*H04L 9/30* (2006.01)

(52) U.S. Cl.
CPC .............. *G06N 20/00* (2019.01); *H04L 9/30* (2013.01)

(58) Field of Classification Search
CPC ................................. G06N 20/00; H04L 9/30
See application file for complete search history.

(56) References Cited

FOREIGN PATENT DOCUMENTS

EP 3739356 A1 * 11/2020 ............. B60L 50/20

OTHER PUBLICATIONS

Cong et al., "Exact and Consistent Interpretation of Piecewise Linear Models Hidden behind APIs: A Closed Form Solution", In Proceedings of the Thirty-sixth IEEE International Conference on Data Engineering (ICDE'20), Dallas, TX, USA, Apr. 20-24, 2020.
Lam et al., Finding Representative Interpretations on Convolutional Neural Networks, In Proceedings of the 2021 IEEE International Conference on Computer Vision (ICCV'21), Virtual, Oct. 11-17, 2021.
Freund et al., Selective Sampling Using the Query by Committee Algorithm, Machine Learning, vol. 28, pp. 133-168 (1997).
Settles, Active Learning Literature Survey, University of Wisconsin-Madison Department of Computer Sciences Technical Report 1648, 2009 (Updated on Jan. 26, 2010).

* cited by examiner

*Primary Examiner* — Morshed Mehedi
*Assistant Examiner* — Saron Matthewos Worku
(74) *Attorney, Agent, or Firm* — BCF LLP

(57) ABSTRACT

Method and servers for performing a privacy-preserving distribution similarity test between first and second data being available to a first and a second client respectively. The method includes generating a target upper boundary value, a target lower boundary value, and a target step size based on first and second boundary values and step-sizes received from the first and second clients receptively, generating non-sensitive testing values, causing generation of first and second Empirical Cumulative Distribution Function (eCDF) values by the first and second client respectively based on the non-sensitive testing values and on the first and second data respectively, acquiring first encrypted eCDF values from the first client, providing encrypted statistic data to the first client, acquiring a result of a privacy-preserving distribution similarity test from the first client, and identifying the first client and the second client as suitable participants for the federated learning task.

18 Claims, 14 Drawing Sheets

SYSTEM AND A METHOD FOR PERFORMING A PRIVACY-PRESERVING DISTRIBUTION SIMILARITY TESTS BETWEEN A PLURALITY OF DATASETS

FIELD

The present technology relates to systems and methods for performing a distribution similarity test. In particular, the present technology relates a system and a method for performing a privacy-preserving distribution similarity test between first and second data while preserving privacy of the data.

BACKGROUND

In many privacy-sensitive fields, like medical data analysis, federated learning provides a way to collaborate for training powerful and data-hungry machine learning algorithms in a secure manner. However, the resulting benefit of the collaboration is heavily dependent on the similarity of the data distribution of the collaborating parties. In other words, in many areas of data science, collaboration only makes sense when data distribution of the collaborating entities is similar. For instance, in federated learning, if the data distribution is completely different, the opposing gradients due to contradictory data samples can negatively impact the performance of the final trained model, making it even worse than the individual models.

Hence, before collaborating in federated learning, there is a need to check if the data distributions of two collaborating parties are statistically similar or not. Traditionally, Kolmogorov-Smirnov test (KS test) is used to test if two sets of data samples are from the same distribution or not. However, performing such a test may require the parties to share their data samples with one another, which is not always possible due to privacy and security concerns.

SUMMARY

Therefore, a system that can perform KS distribution similarity test without compromising the privacy of the collaborating entities is desirable.

Embodiments of the present technology have been developed based on developers' appreciation of shortcomings associated with the prior art.

In a first broad aspect of the present technology, there is provided a method of performing a privacy-preserving distribution similarity test between a first data and a second data, the first data being available to a first client, the second data being available to a second client, the method executable by a server. The method includes acquiring, by the server, first boundary values of the first data and a first step size of the first data, acquiring, by the server, second boundary values of the second data and a second step size of the second data, and generating, by the server, a target upper boundary value, a target lower boundary value, and a target step size, the target upper boundary value and the target lower boundary value being selected amongst the first boundary values and the second boundary values, the target step size being selected amongst the first step size and the second step size. The method further includes generating, by the server, non-sensitive testing values using the target upper boundary value, the target lower boundary value, and the target step size, the non-sensitive testing values including the target lower boundary value, the target upper boundary value, and intermediate values, the intermediate values being values between the target lower boundary value and the target upper boundary value according to the target step size. The method further includes causing, by the server, generation of first Empirical Cumulative Distribution Function (eCDF) values by the first client based on the first data and the non-sensitive testing values, causing, by the server, generation of second eCDF values by the second client based on the second data and the non-sensitive testing values and acquiring, by the server, first encrypted eCDF values from the first client, the first encrypted eCDF values having been generated by the first client using the first eCDF values and a public key of the first client. The method further includes providing, by the server, encrypted statistic data to the first client, the encrypted statistic data having been generated by the second client using the first encrypted eCDF values and second encrypted eCDF values, the second encrypted eCDF values having been generated by the second client using the second eCDF values and the public key of the first client, acquiring, by the server, a result of a privacy-preserving distribution similarity test from the first client, the distribution similarity test having been performed by the first client based on decrypted statistics data, the decrypted statistic data having been generated using the encrypted statistic data and a private key of the first client and identifying, by the server, the first client and the second client as suitable participants for the federated learning task.

In some implementations of the method, the first boundary values include a first upper boundary value and a first lower boundary value. The first upper boundary value is arbitrarily selected from any value which is higher than the highest value of the first data. The first lower boundary value is arbitrarily selected from any value which is lower than the lowest value of the first data.

In some implementations of the method, the first boundary values are different from the lowest value of the first data and the highest value of the first data.

In some implementations of the method, the second boundary values consist of a second upper boundary value and a second lower boundary value. The second upper boundary value is arbitrarily selected from any value which is higher than the highest value of the second data. The second lower boundary value is arbitrarily selected from any value which is lower than the lowest value of the second data.

In some implementations of the method, the second boundary values are different from the lowest value of the second data and the highest value of the second data.

In some implementations of the method, the method further includes causing, by the server, execution of the federated learning task between the first and second clients.

In some implementations of the method, the server is the second client.

In some implementations, each client participating in the distribution similarity test receive protocols from the server and generate keys using standard public-key cryptography algorithms.

In some implementations, each clients distribute their public keys in the environment of Z clients, Z being in integer, and coordinate to synthesize non-sensitive data points S(a, b, c) for computing statistic data. These non-sensitive data points can be made public among all clients.

In some implementations, each client i locally computes the eCDF values $\{F_i(d)|d \in S(a, b, c)\}$ and encrypts them using its public key $p_i$ to generate encrypted eCDF values $\{p_i(F_i(d))|d \in S(a, b, c)\}$. These values are distributed to all other clients $j \in [Z]-i$ in the environment. Each client j compute the encrypted statistic values $\{E_{ji}(d)|d\in S(a, b, c)\}$, for each other client and sends them back to the respective client i.

In some implementations, each client i receives Z−1 sets of encrypted statistic values $\{E_{ji}(d)|d\in S(a, b, c)\}$, for each other client j, and decrypts them using their private keys $pr_i$ to obtain unencrypted statistic data $\{R_{ji}(d)|d\in S(a, b, c)\}$.

In some implementations, for a given client clients i and j, if any values of the set $R_{ji}(d)|d\in S(a, b, c)$ is less than 0, the test that data distribution of clients i and j being same is failed. The result is communicated to the server, and subsequently to the other client.

In some implementations, clients participating request the server for registration into the multiparty secure Kolmogorov Smirnov (KS) test for determining distribution similarity In some implementations, the server sends protocols to clients for conducting the privacy-preserving distribution similarity test and receives acknowledgement signal (ACK).

In some implementations, each client i, generates public $p_i$ and private $pr_i$ keys for encryption/decryption using standard cryptography algorithms. They share their public keys with the server and also shares the constant $p_i(n_i^{-1})$, where $n_i$ is the number of elements in their respective data.

In some implementations, the server distributes public keys and constants to the entire environment.

In some implementations, clients share the following with the server: 1) Arbitrary upper and lower boundary values of their data $[a_i, b_i]$; and 2) step-size $c_i$, which decides the precision/accuracy of the test, statistical significance level $\alpha_i$, selected arbitrarily by each client i, where i is the $i^{th}$ client.

In some implementations, the server finds the parameters acceptable to all clients, fixes them and communicates back the final a, b, c, $\alpha$. It chooses the a, c, $\alpha$ to be min of all $a_i$, $c_i$, and $\alpha_i$, respectively, and b to be the max of all $b_i$s. Using this information, the non-sensitive public data points are generated and shared among all clients.

In some implementations, in the case of exhaustive testing strategy, the server generates the non-sensitive testing values using the following ensemble: $S(a, b, c)=\{a, a+c, a+2c \ldots b\}$.

In some implementations, each client i, locally computes the set of empirical cumulative distribution function (eCDF) values $\{F_i(d)|d\in S(a, b, c)\}$ and locally encrypts them using its public key $p_i$ to generate encrypted eCDF values $\{p_i(F_i(d))|d\in S(a, b, c)$, also denoted by the shorthand $\gamma_i$.

In some implementations, each client i shuffles the encrypted eCDF values $\gamma_i$ and transmits them to the server.

In some implementations, the server transmits the encrypted eCDF values $\gamma_i$, of each client i, to all other clients $j\in[Z]-i$ in the environment.

In some implementations, each client j receives Z−1 sets of encrypted eCDF values $\gamma_i$ corresponding to all other clients $i\in[Z]-j$. Next, each client j, locally computes their own eCDF values $\{F_j(d)|d\in S(a, b, c)\}$ and encrypts them using the public key $p_i$ of all other clients $i\in[Z]-j$ in the system, to generates Z−1 values. Additionally, it locally generates constants $p_i(n_j^{-1})$ for each client $i\in[Z]-j$ in the system using their respective public keys.

In some implementations, each client j computes the encrypted statistic data $\psi_{ji}=\{E_{ji}(d)|d\in S(a, b, c)\}$, corresponding to all other client $i\in[Z]-j$ using, for example, the formula $E_{ji}(d)=c(\alpha)^2 \quad [p_i(n_i^{-1})+p_i(n_j^{-1})]-[p_i(F_i(d))-p_i(F_i(d))]^2$. Here $\alpha$ is the target significance level selected by the server and $c(\alpha)$ is calculated as follows $$c(\alpha) = \sqrt{-\ln\left(\frac{\alpha}{2}\right)\cdot\frac{1}{2}}.$$

For example, 5% significance level, the value of c(0.05)= 1.36.

In some embodiments, each client j transmits the Z−1 sets (for all clients other than client j) of encrypted statistic data $\{\psi_{ji}|i\in[Z]-j\}$ to the server.

In some embodiments, the server receives the encrypted statistic data $\{\psi_{ji}|i=[Z]-j\}$ from each client j and transmits the corresponding values to each respective client i in the system.

In some embodiments, for each client i, the received Z−1 sets of encrypted statistic data $\{\psi_{ji}|j=[Z]-i\}$ corresponding to all clients other than i, are locally decrypted using the respective client i's private key $pr_i$. The resulting decrypted KS-statistic values is denoted $\{R_{ji}(d)|d\in S(a, b, c)\}$, corresponding to client j and client i In some embodiments, for each pair of clients j and i, if any value of the decrypted statistic values $\{R_{ji}(d)|d\in S(a, b, c)\}$ is less than 0, the similarity test of data distribution of clients j and i being same, is declared as failed. This test is performed locally on each client i's local machine for all other client $j\in[Z]-i$, separately. The decisions of whether client j and client i's data distributions are same are denoted $d_{ji}$.

In some embodiments, each client i, sends the set of data distribution similarity decisions $\{d_{ji}|j\in[Z]-i\}$ to the server. These decisions are then conveyed to all clients involved in the privacy-preserving KS distribution similarity test.

In a second broad aspect of the present technology, there is provided a method for performing a privacy-preserving distribution similarity test between a first data and a second data, the first data being available to a first client, the second data being available to a second client, the method executable by a server. The method includes acquiring, by the server, first encrypted data and first random encrypted vectors from the first client, the first encrypted data being an encrypted version of the first data using a public key of the first client. The method further includes causing, by the server, generation of non-sensitive testing values by transmitting the first encrypted data and the first random encrypted vectors to the second client; and causing the second client to generate the encrypted non-sensitive testing values and encrypted threshold based on the first encrypted data, the first random encrypted vectors, the public key of the first client, the second data and second random encrypted vectors generated by the second client using the public key of the first client. The method further includes causing, by the server, determination of non-sensitive testing values based on the encrypted non-sensitive testing values by transmitting the encrypted non-sensitive testing values to the first client, causing the first client to decrypt the non-sensitive testing values based on the encrypted non-sensitive testing values by employing the private key of the first client. The method further includes causing, by the server, generation of first Empirical Cumulative Distribution Function (eCDF) values by the first client based on the first data and the non-sensitive testing values, causing, by the server, generation of second eCDF values by the second client based on the second data and the non-sensitive testing values and acquiring, by the server, first encrypted eCDF values from the first client, the first encrypted eCDF values having been generated by the first client using the first eCDF values and the public key of the first client. The method further includes providing, by the server, encrypted statistic data to the first client, the encrypted statistic data having been generated by the second client using the first encrypted eCDF values, and second encrypted eCDF values, the second encrypted eCDF values having been generated by the second client using the second eCDF values and the public key of the first client.

The method further includes acquiring, by the server, a result of the distribution similarity test from the first client, the distribution similarity test having been performed by the first client based on decrypted statistics data, the decrypted statistic data having been generated using the encrypted statistic data and a private key of the first client. The method further includes identifying, by the server, the first client and the second client as suitable participants for the federated learning task.

In some implementations of the method, the first random encrypted vectors are randomly sampled vectors and encrypted using the public key of the first client.

In some embodiments, in a parameter-setup coordination phase, the values of some additional parameters are decided by the clients and the server. This includes the privacy parameter K, for K-anonymity privacy. The server sends anonymous data synthesis protocols to each client i.

In some implementations, each client i sends two pieces of information to the server: 1) the encrypted values of the sorted data samples $\{p_i(x_j)|x_j \in S_i\}$, where $p_i$ is the public key of the first client and $S_i$ is the dataset of the first client and 2) For each data sample $x_j \in S_i$, 2K indicator vectors, encrypted using $p_i$, denoted by $I_j^{1, 2, 3 \cdots 2K}$, sampled from a random distribution. The server sends this encrypted information to every other client $j \in Z-i$.

In some implementations, for each unique combination of clients, the server randomly assigns one of them the duty to generate non-sensitive testing values. The client with the data generation duty is denoted as j and the other as i. The client j generates the encrypted non-sensitive testing values $\tilde{G}_{ji}$ corresponding to the other client i.

In some implementations, for each unique combination, the client j shares the encrypted non-sensitive testing values $\tilde{G}_{ji}$ with the server, which shares it with the respective client i.

In some implementations, the client i decrypts the data using its private key to obtain $G_{ji}$ and sends it to the server, which eventually shares it with the original client j. As a result, each unique pair of clients (i, j) have non-sensitive testing values which can be used in place of the enumerative sequence S(a, b, c) to perform privacy-preserving distribution similarity test.

In a third broad aspect of the present technology, there is provided a system for performing a privacy-preserving distribution similarity test between a first data and a second data, the first data being available to a first client, the second data being available to a second client. The system includes a processor, a memory configured to store instructions which, upon being executed by the processor, cause the processor to acquire first boundary values of the first data and a first step size of the first data, acquire second boundary values of the second data and a second step size of the second data, generate a target upper boundary value, a target lower boundary value, and a target step size, the target upper boundary value and the target lower boundary value being selected amongst the first boundary values and the second boundary values, the target step size being selected amongst the first step size and the second step size. The processor is further caused to generate non-sensitive testing values using the target upper boundary value, the target lower boundary value, and the target step size, the non-sensitive testing values including the target lower boundary value, the target upper boundary value, and intermediate values, the intermediate values being values between the target lower boundary value and the target upper boundary value according to the target step size. The processor is further caused to cause generation of first Empirical Cumulative Distribution Function (eCDF) values by the first client based on the first data and the non-sensitive testing values, cause generation of second eCDF values by the second client based on the second data and the non-sensitive testing values, acquire first encrypted eCDF values from the first client, the first encrypted eCDF values having been generated by the first client using the first eCDF values and a public key of the first client. The processor is further caused to provide encrypted statistic data to the first client, the encrypted statistic data having been generated by the second client using the first encrypted eCDF values and second encrypted eCDF values, the second encrypted eCDF values having been generated by the second client using the second eCDF values and the public key of the first client, acquire a result of a privacy-preserving distribution similarity test from the first client, the distribution similarity test having been performed by the first client based on decrypted statistics data, the decrypted statistic data having been generated using the encrypted statistic data and a private key of the first client and identify the first client and the second client as suitable participants for the federated learning task.

In some implementations of the method, the first boundary values consist of a first upper boundary value and a first lower boundary value. The first upper boundary value being arbitrarily selected from any value which is higher than the highest value of first data. The first lower boundary value being arbitrarily selected from any value which is lower than the lowest value of the first data.

In some implementation of the system, the first boundary values are different from the lowest value of the first data and the highest value of the first data.

In some implementation of the system, the processor is further configured to cause execution of the federated learning task between the first and second clients.

In some implementation of the system, the processor is the second client.

In a fourth broad aspect of the present technology, there is provided a system for performing a privacy-preserving distribution similarity test between a first data and a second data, the first data being available to a first client, the second data being available to a second client, the system including a processor, a memory configured to store instructions which, upon being executed by the processor, cause the processor to acquire first encrypted data and first random encrypted vectors from the first client; the first encrypted data being an encrypted version of the first data using the public key of the first client, cause generation of encrypted non-sensitive testing values by transmitting the first encrypted data and the first random encrypted vectors to the second client and causing the second client to generate the encrypted non-sensitive testing values based on the first encrypted data, the first random encrypted vectors, the public key of the first client, second random vectors generated by the second client and the second data. The processor is further caused to cause determination of non-sensitive testing values based on the encrypted non-sensitive testing values by transmitting the encrypted non-sensitive testing values to the first client. The processor is further caused to cause the first client to generate the non-sensitive testing values based on the encrypted non-sensitive testing values by employing the private key of the first client, cause generation of first Empirical Cumulative Distribution Function (eCDF) values by the first client based on the first data and the non-sensitive testing values, cause generation of second eCDF values by the second client based on the second data and the non-sensitive testing values, and acquire first encrypted eCDF values from the first client, the first encrypted eCDF values having been generated by the first client using the first eCDF values and the public key of the first client. The processor is further caused to provide encrypted statistic data to the first client, the encrypted statistic data having been generated by the second client using the first encrypted eCDF values and second encrypted eCDF values, the second encrypted eCDF values having been generated by the second client using the second eCDF values and the public key of the first client, acquire a result of the distribution similarity test from the first client, the distribution similarity test having been performed by the first client based on decrypted statistics data, the decrypted statistic data having been generated using the encrypted statistic data and the private key of the first client, and identify the first client and the second client as suitable participants for the federated learning task.

In some implementation of the system, the first random encrypted vectors are randomly sampled vectors encrypted using the public key of the first client.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
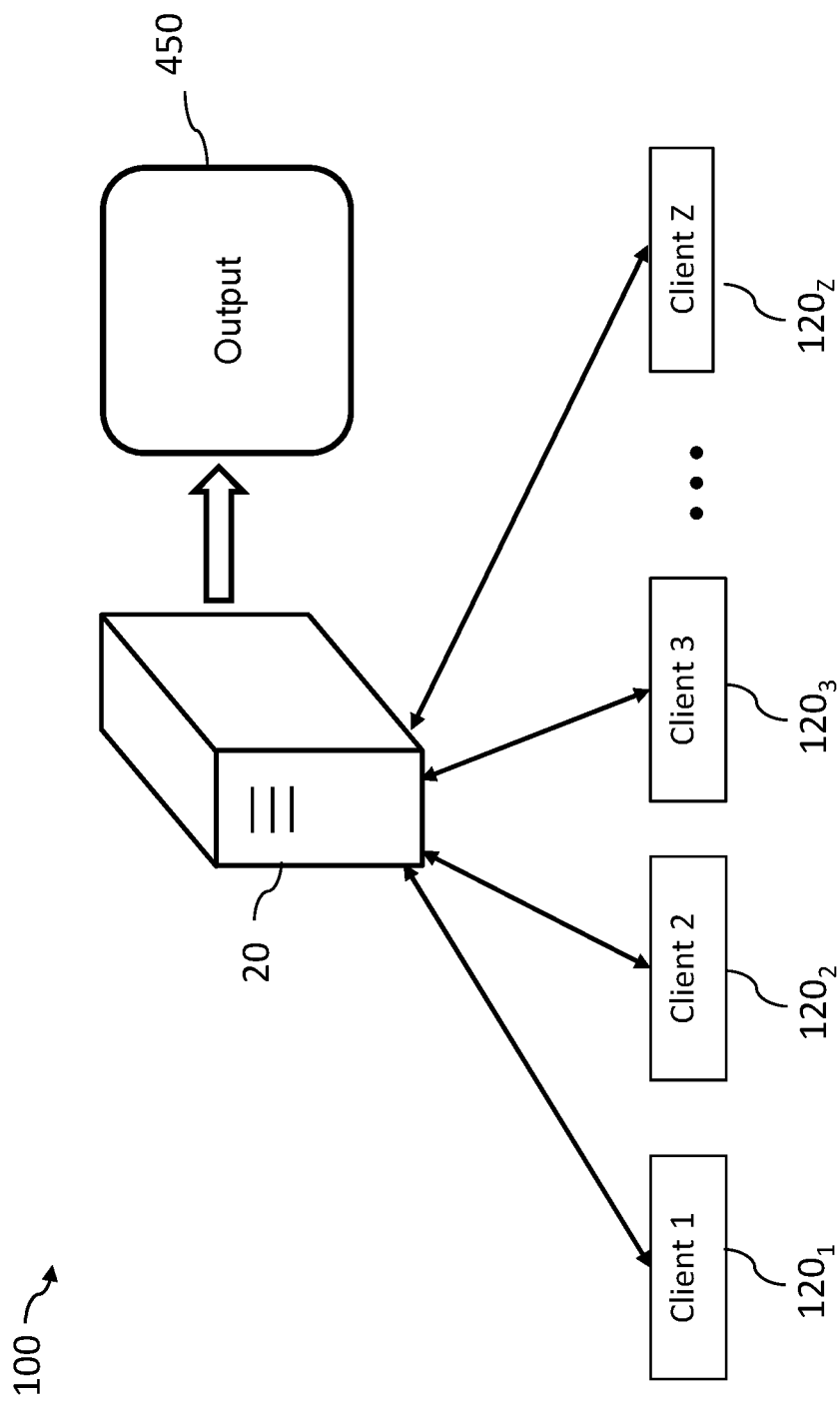
FIG. 1 is a schematic representation of collaborative environment in accordance with non-limiting embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Kolmogorov-Smirnov (KS) test is used to determine whether two sets of samples are from the same distribution or not. Suppose we have two parties (clients) i and j wishing to conduct a KS test. Let's denote their datasets as $S_i=\{x_1, x_2, \ldots, x_{|S_i|}\}$ and $S_j=\{y_1, y_2, \ldots, y_{|S_j|}\}$, respectively. Further, we denote their empirical Cumulative Distribution Function (eCDF) as $F_i(d)$ and $F_j(d)$, respectively, where $$F_i(d) = \frac{1}{S_i}\sum_{l=1}^{|S_i|} 1_{[-\infty,d]}(x_l)$$

where $1_{[-\infty, d]}(x_l)$ is indicator function which is equal to 1 if $x_l \leq d$, 0 otherwise.

Kolmogorov Smirnov (KS) test, between two clients i and j, is said to be failed if, for any d, the following KS statistic data $R_{ji}$ is less than zero:

$$R_{ji}(d) = c^2(\alpha)[n_i^{-1} + n_j^{-1}] - [F_i(d) - F_j(d)]^2$$

where $\alpha$ is the significance level of the hypothesis testing, and $c(\alpha)$ is defined based on a pre-defined lookup table. In some implementations, the significance level is set to $\alpha=5\%$ which gives $c(0.05)=1.36$ according to the pre-defined lookup table. The lookup table can be calculated using the formula $$c(\alpha) = \sqrt{-\ln\left(\frac{\alpha}{2}\right)\cdot\frac{1}{2}}.$$

It should be noted that a statistic data for a calculated using the formula client i with respect to a client j is the same value of the statistic data for the client j with respect to the client i (i.e. $R_{ij}=R_{ji}$).

In the context of the present disclosure, statistic data may include KS statistic data or other form of statistic data, which is sometimes referred to as "statistic data", for the sake of generality, through this document. The term statistic data include probable trivial or non-trivial modifications of the KS statistic data described above which a person skilled in the art may be familiar with.

As a contextualisation, a KS test may be performed, for example and without limitations, in a situation where a journalist desire to know whether family income distributions of admitted students are statistically significantly different between a first and a second school. Family income data are considered sensitive and the first and second schools may not agree to share said data with each other. In this case, the journalist may ask the first and second schools to perform a privacy-preserving distribution similarity test as described in the present disclosure.

As another example, a researcher may desire to have a privacy-preserving distribution similarity test in the following situation. The researcher doubts the incidence rate of a rare disease is related to the locations of a first and a second city. To verify his hypothesis, the researcher may conduct a KS test of incidence rates over age between the first city and the second city. Therefore, the researcher may ask the hospitals located at the first city and the second city respectively to conduct a privacy-preserving distribution similarity test together, since the datasets are sensitive and may not be sharable.

Broadly speaking, in the context of the present disclosure, multiple parties (a total of Z) referred to as "clients" k for $\{k\}_{k=1}^{Z}$ desire to conduct pair-wise privacy-preserving distribution similarity test of their datasets in a secured manner. In other words, the clients desire to perform a privacy-preserving KS-test. For example, the clients may desire to perform said test to know whether their respective datasets belong to a same distribution in view of a potential collaboration, while maintain privacy for their respective individual datasets.

In the context of the present disclosure, K-anonymity is defined as follows. For a given range of data [a, b] and for a given client i owning $|S_i|$ unique datapoints $\{x_l\}_{l=1}^{|S_i|}$ in the range [a, b]. Without loss of generality, we assume $x_l<x_{l'}$ if $l<l'$. These $|S_i|$ data points split the range [a, b] into $|S_i|+1$ intervals $[a, x_1], \ldots [x_l, x_{l+1}] \ldots [x_{|S_i|}, b]$. Denote the set of theses intervals as $P_i$. K-anonymity of client i with respect to another client j whose respective data is $y_l \in \{y_l\}_{l=1}^{|S_j|}$ is reached when each $y_l$ can equally likely appear in K different intervals from $P_i$.

A Fully Homomorphic Encryption (FHE) based privacy-preserving distribution similarity test may be performed by encrypting the data using one of the client's (client i in this case) public keys and transfer it to the other client j. Then, all the computations may be performed in the encrypted space of client i's public keys. Using the encrypted transferred data, Empirical Cumulative Distribution Function (eCDF) are computed, which may be done by employing encrypted comparison operations. However, with the fact that FHE only supports addition and multiplication, the comparison cannot be directly used, which constrain to the usage of polynomial approximation techniques, which may be inefficient and inaccurate. To alleviate some of these drawbacks, there is disclosed systems and methods for a secure, accurate, and efficient conducting of privacy-preserving distribution similarity tests.

Referring to FIG. 1, there is shown a schematic diagram of a collaborative environment 100 including a server 20 and a plurality of client devices $120_k$, or simply "clients" $120_k$ communicably connected to the server 20. In sue, the clients $120_k$ are communicatively coupled to the server 20 over a communication network via any wired or wireless communication link including, for example, 4G, LTE, Wi-Fi, or any other suitable connection. In some non-limiting implementations of the present technology, the communication network may be implemented as the Internet. In other implementations of the present technology, the communication network can be implemented differently, such as any wide-area communication network, local-area communication network, a private communication network and the like. How the communication links between the server 20 and the clients $120_k$ are implemented will depend inter alia on how the server 20 and the clients $120_k$ are implemented The server 20 is suitable for implementing non-limiting implementations of the present technology. It is to be expressly understood that the server 20 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the server 20 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the server 20 may provide in certain instances simple implementations of the present technology, and that where such is the case they have been presented in this manner as an aid to understanding. As persons skilled in the art would understand, various implementations of the present technology may be of a greater complexity.

Generally speaking, the server 20 is configured to perform a privacy-preserving distribution similarity test (a specific implementation of which is the privacy-preserving distribution similarity test described in this document) on a plurality of sets of data, each set of data corresponding to one of the clients $120_k$. In this implementation, the server 20 perform a privacy-preserving distribution similarity test that will be described in greater details herein after and generate a result 450 of the privacy-preserving distribution similarity test. For example, a first client $120_1$ having first data and a second client $120_2$ having second data may use the server 20 to perform a privacy-preserving distribution similarity test to test compatibility of their respective first and second data. In this implementation the result 450 is transmitted from the server 20 to the corresponding clients of which data have been used to perform said privacy-preserving distribution similarity test. As such, any system variation configured to enable a privacy-preserving distribution similarity test on a plurality of sets of data while maintaining privacy of the data between the clients can be adapted to execute embodiments of the present technology, once teachings presented herein are appreciated.

Developers of the present technology have realized that data privacy is beneficial for clients $120_k$ of the collaborative environment 100 for ensuring confidentiality. In some implementations of the present technology, the server 20 may perform a privacy-preserving distribution similarity test using an exhaustive testing strategy or a smart-testing strategy, both strategies being described in greater details herein below.

In this implementation, multiple clients $120_k$ may join the collaborative environment 100 with an intention to perform a privacy-preserving distribution similarity test. In use, the server 20 transmits and receives information according to protocols and methods described herein. For a given group of clients $120_k$ that desires to perform a shared privacy-preserving distribution similarity test, the server 20 outputs indication (e.g. identification) of one or more clients $120_k$ that have a same data distribution among the given group of clients $120_k$. It should be noted that functions of the server 20 may be performed by a separate entity distinct from all clients $120_k$ but can also be performed by one of clients $120_k$. In the latest case, a situation where two clients $120_k$ desire to perform a privacy-preserving distribution similarity test together, it can be said that the privacy-preserving distribution similarity test is a "peer-to-peer" privacy-preserving distribution similarity test given that one of the two clients performs functions of the server 20 as described herein.

In the context of the present disclosure, a first and a second client desire to perform a federated learning task using first data being available to the first client and second data being available to the second client. Broadly speaking, federated learning is a machine learning collaborative technique that may be used to train a given machine learning model (MLM) across multiple decentralized devices (e.g. clients $120_k$) using data stored thereon. As an example, a first client $120_1$ (e.g. a first hospital) may desire to collaborate with a second client $120_2$ (e.g. a second hospital) and a third client $120_3$ (e.g. a third hospital) to jointly train a MLM using a federated learning machine learning algorithm (MLA). However, the MLM may efficiently be trained if the first, second and third clients have a same data distribution. Therefore, before starting a collaboration between the first, second and third clients, they may desire to assess whether their datasets belong to a same distribution using a Kolmogorov-Smirnov (KS) distribution similarity test. For example, an output of the KS test may indicate that first data and second data of the first and second client respectively have a same data distribution, while the first data and third data of the first and third client respectively are different. Hence, to optimize a training of the MLM, only the first and second client may collaborate in the federated learning task and the third client may opt out.

However, KS test requires various parties to share their datasets. Due to privacy concerns, hospitals may not be willing to share their datasets. Hence, the main challenge we address is how to perform privacy-preserving distribution similarity test which can preserve privacy of datasets. Apart from the above-mentioned secure similarity checking method, privacy-preserving distribution similarity test can also be used in other real-world applications It should be noted that, even though the illustrative example of reasons why a first and a second clients may desire to perform a privacy-preserving distribution similarity test is to eventually perform a federated learning task, other reasons why they may desire to perform a privacy-preserving distribution similarity test may vary in alternative embodiments. For example, the first and second clients may desire to assess whether their respective dataset have a same data distribution. As such, any system variation configured to perform a distribution similarity test between datasets while preserving privacy of the datasets can be adapted to execute embodiments of the present technology, once teachings presented herein are appreciated.

Figure 2:
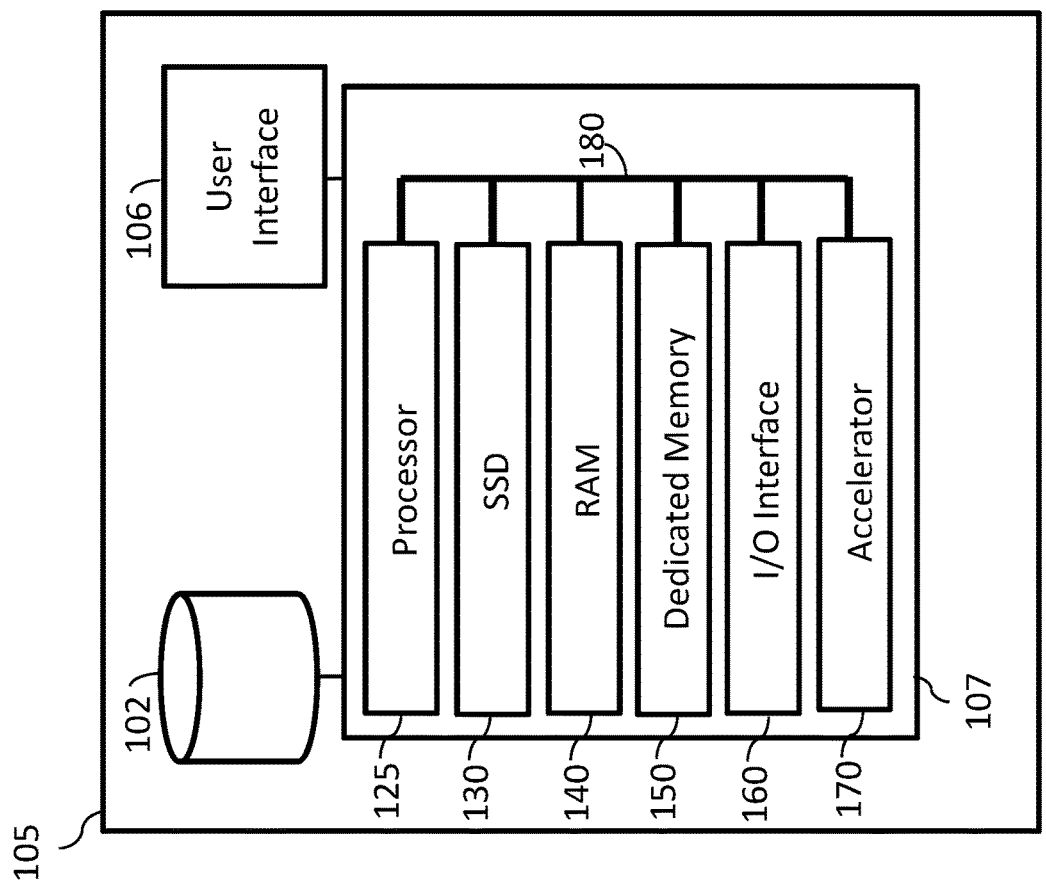
FIG. 2 is a schematic representation of an electronic device configured in accordance with non-limiting embodiments of the present technology.

With reference to FIG. 2, there is shown an electronic device 105 in accordance with non-limiting implementations of the present technology. The server 200 and the clients $120_k$ may implemented as the electronic device 105. The electronic device 105 includes a computing unit 107. In some embodiments, the computing unit 107 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 107 includes various hardware components including one or more single or multi-core processors collectively represented by a processor 125, a solid-state drive 130, a RAM 140, a dedicated memory 150 and an input/output interface 160. The computing unit 107 may be a generic computer system.

In some other embodiments, the computing unit 107 may be an "off the shelf" generic computer system. In some embodiments, the computing unit 107 may also be distributed amongst multiple systems. The computing unit 107 may also be specifically dedicated to the implementation of the present technology. As a person in the art of the present technology may appreciate, multiple variations as to how the computing unit 107 is implemented may be envisioned without departing from the scope of the present technology.

Communication between the various components of the computing unit 107 may be enabled by one or more internal and/or external buses 180 (e.g. a PCI bus, universal serial bus, IEEE 1394 "Firewire" bus, SCSI bus, Serial-ATA bus, ARINC bus, etc.), to which the various hardware components are electronically coupled.

The input/output interface 160 may provide networking capabilities such as wired or wireless access. As an example, the input/output interface 160 may include a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 130 stores program instructions suitable for being loaded into the RAM 140 and executed by the processor 125. Although illustrated as a solid-state drive 130, any type of memory may be used in place of the solid-state drive 130, such as a hard disk, optical disk, and/or removable storage media.

The processor 125 may be a general-purpose processor, such as a central processing unit (CPU) or a processor dedicated to a specific purpose, such as a digital signal processor (DSP). In some embodiments, the processor 125 may also rely on an accelerator 170 dedicated to certain given tasks. In some embodiments, the processor 125 or the accelerator 170 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the electronic device 105 may include a Human-Machine Interface (HMI) 106. The HMI 106 may include a screen or a display capable of rendering results 450 of privacy-preserving distribution similarity tests and/or any other information suitable for performing the methods described herein. In this implementation, the display of the HMI 106 includes and/or be housed with a touchscreen to permit users to input data via some combination of virtual keyboards, icons, menus, or other Graphical User Interfaces (GUIs). The HMI 106 may thus be referred to as a user interface 106. In some embodiments, the display of the user interface 106 may be implemented using a Liquid Crystal Display (LCD) display or a Light Emitting Diode (LED) display, such as an Organic LED (OLED) display. The device may be, for example and without being limitative, a handheld computer, a personal digital assistant, a cellular phone, a network device, a smartphone, a navigation device, an e-mail device, a game console, or a combination of two or more of these data processing devices or other data processing devices. The user interface 106 may be embedded in the electronic device 105 as in the illustrated embodiment of FIG. 2 or located in an external physical location accessible to the user. For example, the user may communicate with the computing unit 107 (i.e. send instructions thereto and receive information therefrom) by using the user interface 106 wirelessly connected to the computing unit 107. The computing unit 107 may be communicate with the user interface 106 via a network (not shown) such as a Local Area Network (LAN) and/or a wireless connexion such as a Wireless Local Area Network (WLAN).

The electronic device 105 may include a memory 102 communicably connected to the computing unit 107 for storing outputs of privacy-preserving distribution similarity tests, data to be tested using a privacy-preserving distribution similarity test, public and/or private keys of the clients $120_k$ for example. The memory 102 may be embedded in the electronic device 105 as in the illustrated embodiment of FIG. 2 or located in an external physical location. The computing unit 107 may be configured to access a content of the memory 102 via a network (not shown) such as a Local Area Network (LAN) and/or a wireless connection such as a Wireless Local Area Network (WLAN).

The electronic device 105 may also include a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

It should be noted that the computing unit 107 may be implemented as a conventional computer server or cloud-based (or on-demand) environment. Needless to say, the computing unit 107 may be implemented in any other suitable hardware, software, and/or firmware, or a combination thereof. In the depicted non-limiting embodiments of the present technology in FIG. 2, the computing unit 107 is a single server. In alternative non-limiting embodiments of the present technology, the functionality of the computing unit 107 may be distributed and may be implemented via multiple servers.

Figure 3:
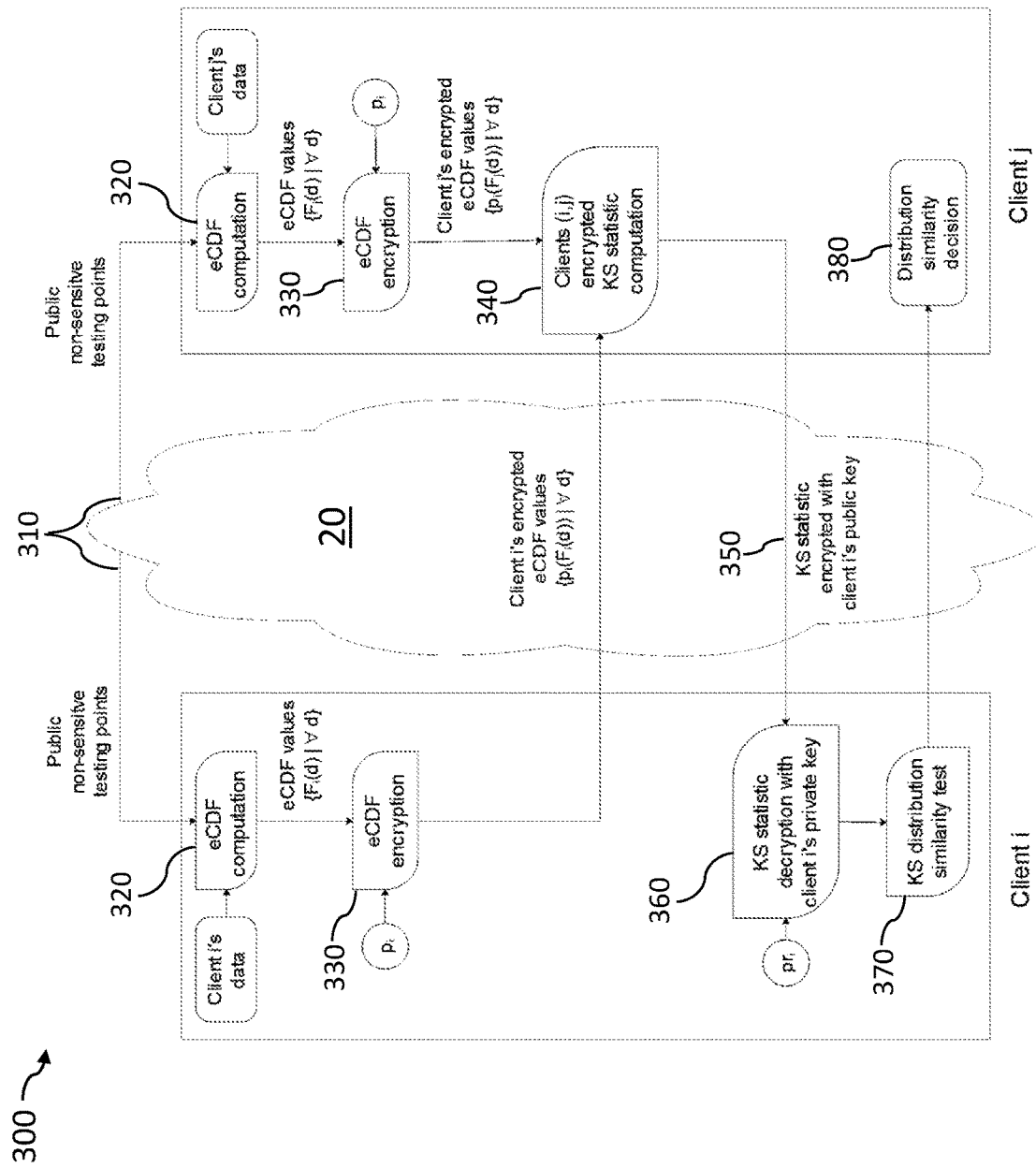
FIG. 3 is schematic representation of communication between a first client and a second client of the collaborative environment of FIG. 1 in accordance with non-limiting embodiments of the present technology.

FIG. 3 is a representation 300 of physical deployment of the present technology and data flow between the server 20, a first client i and a second client j. In the context of the present disclosure, the first client may be embodied as "client i", and the second client may be embodied as "client j".

It should be noted that, even though illustrative implementations of the method disclosed herein relates to the first and the second clients, operations of the methods may be executed for any pair of clients that participate in the current distribution similarity test (e.g. privacy-preserving distribution similarity test).

The first and second clients i, j desire to perform a privacy-preserving distribution similarity test together according to non-limiting implementation of the present technology. It should be noted that roles of client i and client j are interchangeable in the following description.

Broadly speaking, an aspect of the present technology is to allow multiple parties (e.g. the first and second clients i, j) to conduct a privacy-preserving distribution similarity test without comprising the privacy of their datasets in a secure, accurate and efficient manner. In use, the server 20 performs a pair-wise KS test between each pair of clients (e.g. the first and second clients i, j), and generates the result 450 indicative of a similarity of data of the clients of the pair of clients. Operations described herein below relatively to the first and second clients i, j are executed for every pair of clients that participate in the current distribution similarity test (e.g. KS test). In this implementation, the server 20 may perform said privacy-preserving distribution similarity test without involving encryption of data of the clients, which is less-time consuming and less error-prone than systems operating using encryption of data of the clients.

In use, the server 20 generates non-sensitive testing values {d} at operation 310 using the exhaustive testing strategy or the smart testing strategy, said strategies being described in greater details hereinafter. These non-sensitive data points are not private and can be transferred to both clients i and j without any privacy concerns. In this embodiment, the server 20 and the first and second clients i, j execute a Handshaking and Initialization Module 400 described in FIGS. 4 and 5 at operation 310.

The server 20 further causes the first and second clients i, j to locally generate, at operation 320, the empirical Cumulative Distribution Function (eCDF) values based on the non-sensitive testing values and their respective unencrypted data, stored locally at respective machines. The eCDF values of client i are denoted $\{F_i(d)|\forall d\}$, and the eCDF values of client j are denoted $\{F_j(d)|\forall d\}$. The first and second clients i, j execute a KS-statistic Computation Module 600 at operation 320 and described in FIGS. 6 and 7 to generates their respective eCDF values. The server 20 may further cause, at operation 330, the first and second clients i, j to encrypt their corresponding eCDF data using the public key $p_i$ of the client i. The server 20 further causes the first client i to transmit the corresponding encrypted eCDF values to the client j.

Figure 6:
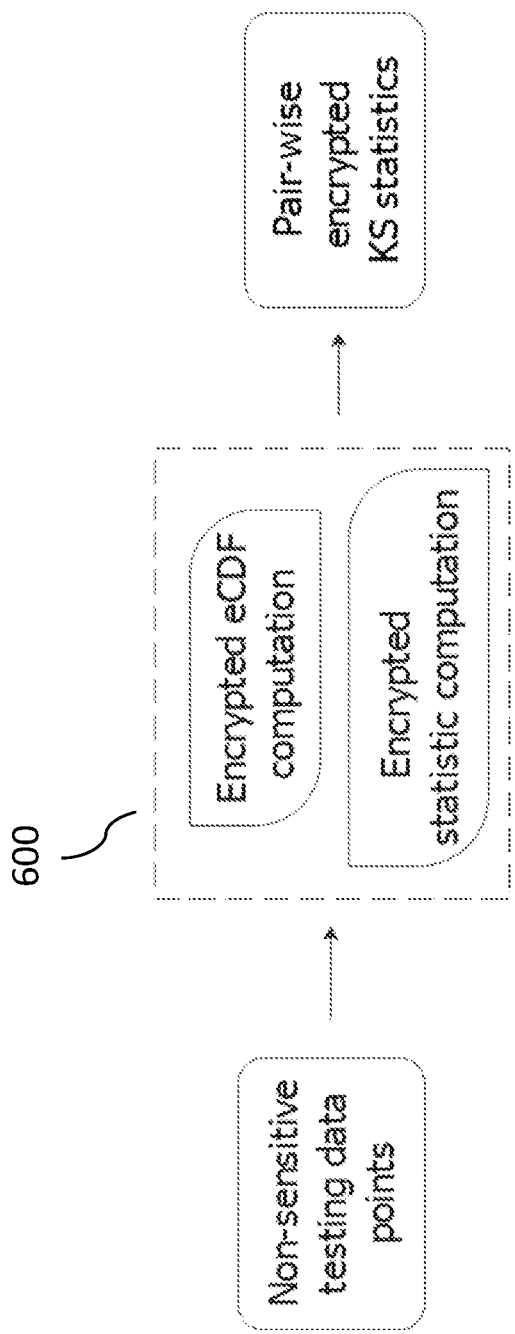
FIG. 6 is a block diagram of a Statistic Computation Module between clients and a server of the collaborative environment of FIG. 1 in accordance with non-limiting embodiments of the present technology.
Figure 7:
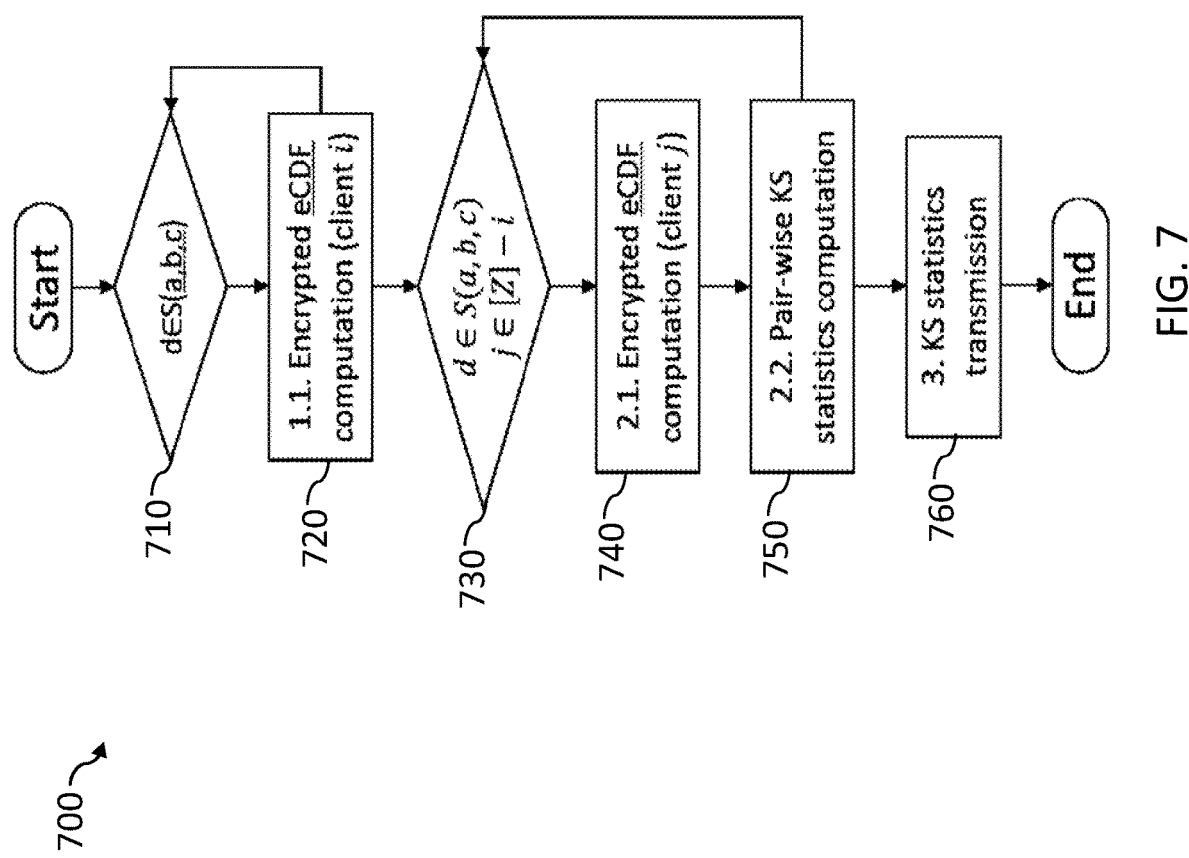
FIG. 7 illustrates a flow diagram showing operations of a method for executing the KS-statistic Computation Module in accordance with non-limiting embodiments of the present technology.

The server 20 further causes the client j to generate, at operation 340, a statistic data by using encrypted addition and encrypted multiplication operations, again using the KS-statistic Computation Module 600 described in FIGS. 6 and 7. Therefore, the statistic data is computed in an encrypted space of client i's public keys.

The server 20 further causes the client j to transmit, at operation 350, the encrypted statistic data to the client i and subsequent decryption of the encrypted statistic data by the client i using a private key $pr_i$ of client i at operation 360.

In this implementation, the server 20 further causes the client i to determine an output, which will be described in greater details hereinafter, of the privacy-preserving distribution similarity test using the decrypted statistic data at operation 370 and transmit a result 450 thereof to the server 20 and the client j at operation 380. The first client i executes a Distribution Similarity Decision Module 800 at operation 370 and described in FIGS. 8 and 9 to perform the privacy-preserving distribution similarity test.

By doing so, the server 20 provides a secure environment for the first and second clients i, j to perform the privacy-preserving distribution similarity test by causing transmission of encrypted and/or anonymized data. As a result, the individual data items of each client satisfy K-anonymity definition of privacy. Moreover, operations performed by the server 20, the first client i and the second client j involve non-encrypted version of the first and second data, expect only addition and multiplication on encrypted data which does not rely on approximations. Finally, the server 20, the first client i and the second client j do not rely on inefficient or inaccurate comparison operations required in naïve fully homomorphic encryption (FHE) based methods, which are known to be computationally inefficient and inaccurate.

Figure 4:
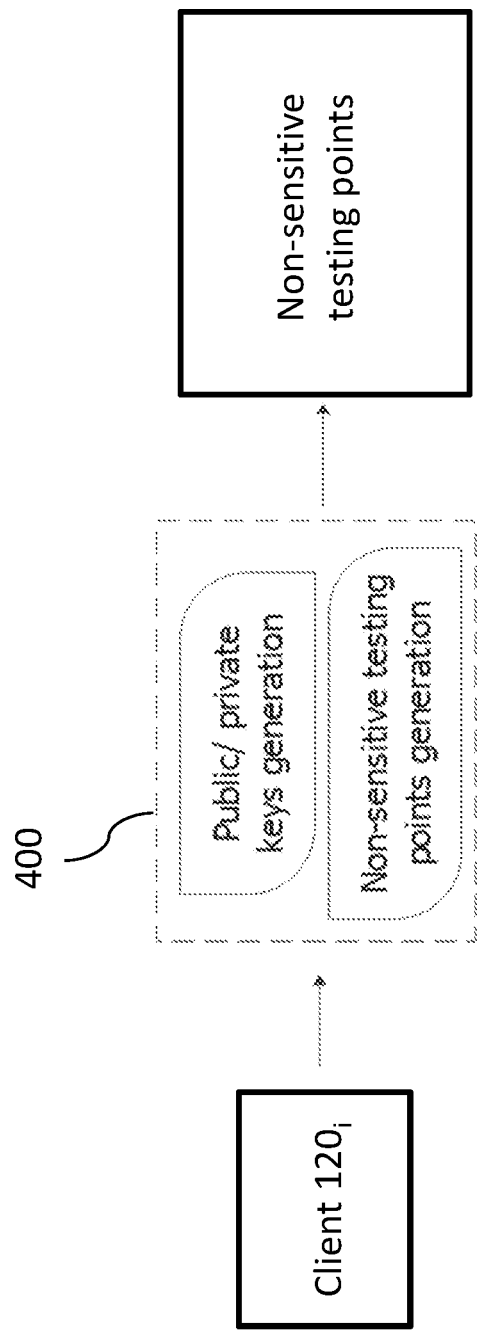
FIG. 4 is a block diagram of a Handshaking and Initialization Module between clients and a server of the collaborative environment of FIG. 1 in accordance with non-limiting embodiments of the present technology.
Figure 5:
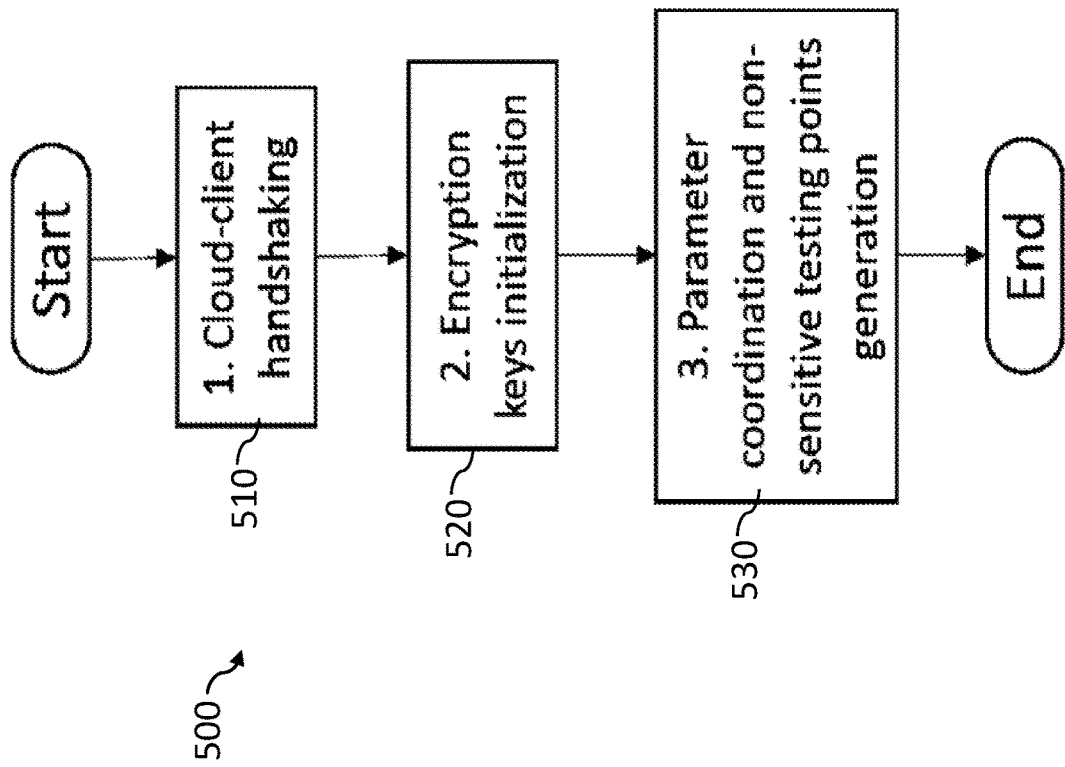
FIG. 5 illustrates a flow diagram showing operations of a method for executing the Handshaking and Initialization Module in accordance with non-limiting embodiments of the present technology.

FIG. 4 is a block diagram of the Handshaking and Initialization Module 400 executed by the server 200 and the clients $120_k$ that desire to perform a privacy-preserving distribution similarity test. In use, each client $120_k$ receives necessary protocols from the server 20 and generates keys using pre-determined public-key cryptography algorithms as specified in the received protocols. More specifically, FIG. 5 is a flow chart showing operations of a method 500 for executing the Handshaking and Initialization Module 400. It should be noted that, even though illustrative implementations of the method 500 relates to the first and the second clients i, j, operations of the methods may be executed for any pair of clients that participate in the current distribution similarity test. In use, the method 500 includes receiving, by the server 20 at operation 510, requests from the clients i, j for registration into a multiparty privacy-preserving distribution similarity test for determining the pair-wise distribution similarity of clients $120_k$. At operation 510, the server 20 further transmits necessary protocols to the clients i, j for conducting the KS test and receives acknowledgement signal (ACK).

Each client i further distributes its corresponding public keys to the other client j (for example through the server 20). The server 20 further generates the non-sensitive testing points for computing statistic data. In this implementation, the non-sensitive testing points are generated using the exhaustive testing strategy. These non-sensitive data points can be made public among all clients. More specifically and with reference to FIG. 5, the method 500 includes causing, by the server 20 at operation 520, each client i to generate a corresponding public key $p_i$ and a corresponding private key $pr_i$ for encryption/decryption using standard cryptography algorithms. At operation 520, each client i further share their public keys along with constant $p_i(n_i^{-1})$, where $n_i$ is the number of elements in their respective dataset, with the server 20 and all other clients $120_k$.

The server 20 further generates the non-sensitive testing points {d}. To do so, each client i transmits to the server 20, in this implementation:

an arbitrary upper boundary value and an arbitrary lower boundary value of their data $[a_i, b_i]$; and a step-size $c_i$, which is indicative of a desired precision/accuracy of the privacy-preserving distribution similarity test and a statistical significance level $\alpha_i$.

For example, for the first client i having corresponding first data in a range [10, 567] where 10 is the minimal value of the first data and 567 is the maximal value of the first data, the first client i may choose the arbitrary upper boundary value to be 802 and the arbitrary lower boundary value to be 3 (three). As such, the actual minimal and maximal values (in this example 10 and 567) are not shared with the server 20 and the privacy of the first data in ensured. The step-size may be chosen by the first client to be inferior to the minimum of differences between any given two values of the first data. For example, if 0.5 is the minimal difference between any couple of values in the first data, the first client i may transmit a step-size $c_i$ equal to 0.3.

The server 20 further generates, at operation 530, a target upper boundary value, a target lower boundary value, and a target step size. The target upper boundary value b is selected amongst the arbitrary upper boundary values received from the clients. In this implementation, the target upper boundary value b is the highest value of the received arbitrary upper boundary values. The target lower boundary value a is selected amongst the arbitrary lower boundary values received from the clients. In this implementation, the target lower boundary value a is the lowest value of the received arbitrary lower boundary values. The target step size c is selected amongst the arbitrary step sizes received from the clients. In this implementation, the target step size c is the lowest value of the received arbitrary step sizes.

The server 20 may further generates a set of non-sensitive testing points {d} where {d}=S(a, b, c)={a, a+c, a+2c ... b}. The non-sensitive testing points {d} are further transmitted to the clients (e.g. first and second clients i, j) as described with respect to FIG. 3. S(a, b, c) is the non-sensitive testing points generated using the exhaustive testing strategy.

FIG. 6 is a block diagram of the KS-statistic Computation Module 600 executed by the clients 120$_k$ to determine the statistic data $R_{ji}$ and FIG. 7 is a flow chart of a method 700 for executing the KS-statistic Computation Module 600 for each pair of clients (i, j) in the collaborative environment 100 that participates in the current privacy-preserving distribution similarity test. It should be noted that, even though illustrative implementations of the methods 600 and 700 relate to the first and the second clients i, j, operations of the methods may be executed for any pair of clients that participate in the current distribution similarity test.

With reference to both FIGS. 6 and 7, the method 700 includes causing, by the server 20, for each pair of client (i, j) to generate a corresponding eCDF values {$F_i$(d)|d∈ S(a, b, c)} and {$F_j$(d)|d∈ S(a, b, c)} respectively, and encrypts said values using the public key of the client i, thereby generating the encrypted eCDF values {$p_i(F_i$(d))|d∈ S(a, b, c)} and {$p_i(F_j$(d))|d∈ S(a, b, c)}. Note that, for each pair of clients (i, j), the public key of the client i is used for encryption of eCDF data for both client i and client j. Thereafter, the client i may further shuffle its encrypted eCDF values {$p_i(F_i$(d))|d∈ S(a, b, c)} before transmitting the said values to the server 20.

For each pair of clients (i, j) in the collaborative environment 100 that participates in the current privacy-preserving distribution similarity test, execution of the KS-statistic Computation Module 600 further includes transmission, through the server 20, of the encrypted eCDF values of client i {$p_i(F_i$(d))|d∈ S(a, b, c)} to the other client j. The client j further computes the encrypted values of statistic data {$E_{ji}$(d)|d∈ S(a, b, c)}, corresponding to the client pair (i, j) using the formula $E_{ji}(d)=c(\alpha)^2 [p_i(n_i^{-1})+p_i(n_j^{-1})]-[p_i(F_i(d))-p_i(F_j(d))]^2$. Here $\alpha$ is the target significance level selected by the server 20 and $c(\alpha)$ is calculated as follows $$c(\alpha) = \sqrt{-\ln\left(\frac{\alpha}{2}\right) \cdot \frac{1}{2}}.$$

For example, 5% significance level, the value of c(0.05)= 1.36. Further, the client j sends the encrypted values of the statistic data {$E_{ji}$(d)|d∈ S(a, b, c)}, also denoted as $\psi_{ji}$, to the server 20.

In the illustrative situation of FIG. 7, the method 700 includes transmitting, by the server 20 at operation 710, the non-sensitive testing points {d} to the first client i. The method 700 further includes causing, at operation 720, the first client i to generate corresponding eCDF values {$F_i$(d) |d∈ S(a, b, c)} and encrypts said values using the public key $p_i$ of the client i, thereby generating encrypted eCDF values {$p_i(F_i$(d))|d∈ S(a, b, c)}.

The method 700 further includes transmitting, by the server 20 at operation 730, the non-sensitive testing points d to the second client j. The method 700 further includes causing, at operation 740, the second client j to generate corresponding eCDF values {$F_j$(d)|d∈ S(a, b, c)} and encrypts said values using the public key $p_i$ of the client i, thereby generating encrypted eCDF values {$p_i(F_j$(d)|d∈ S(a, b, c)}.

In the illustrative situation of FIG. 7, the method 700 includes causing, by the server 200 at operation 750, the second client j to generate, based on the received encrypted eCDF values {$p_i(F_i$(d))|d∈ S(a, b, c)} from the first client i and the encrypted eCDF values {$p_i(F_j$(d))|d∈ S(a, b, c)} of the second client j, the encrypted values of KS statistic {$E_{ji}$(d)|d∈ S(a, b, c)}, also denoted as $\psi_{ji}$, using the public key $p_i$ of the first client i.

The method 700 further includes causing, by the server 20 at operation 760, transmission of the encrypted values of statistic data $\psi_{ji}$ computed by the second client j, to the first client i, for each pair of clients (i, j) in the collaborative environment 100.

From the point of view of each client j, it receives Z−1 sets of encrypted (using the respective client i's public key) eCDF values corresponding to all other clients i∈[Z]−j, Z being the number of clients participating in the current privacy-preserving distribution similarity test in the collaborative environment 100. Further, each client j locally computes the Z−1 encrypted eCDF values corresponding to each client i∈[Z]−j using the respective client i's public key. Thereafter, each client j computes the Z−1 values of encrypted statistic data {$E_{ji}$(d)|d∈ S(a, b, c)}, also denoted as $\psi_{ji}$, corresponding to each client pair (i, j) and transmits it back to the respective client i.

Figure 8:
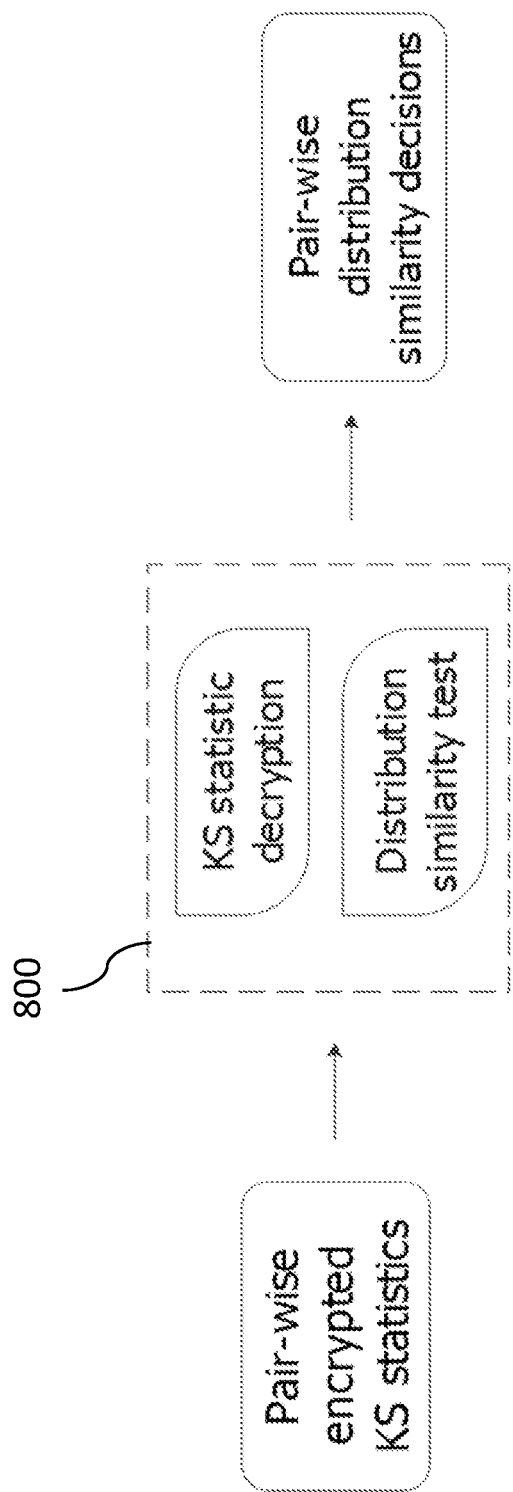
FIG. 8 is a block diagram of a Distribution Similarity Decision Module between clients and a server of the collaborative environment of FIG. 1 in accordance with non-limiting embodiments of the present technology.
Figure 9:
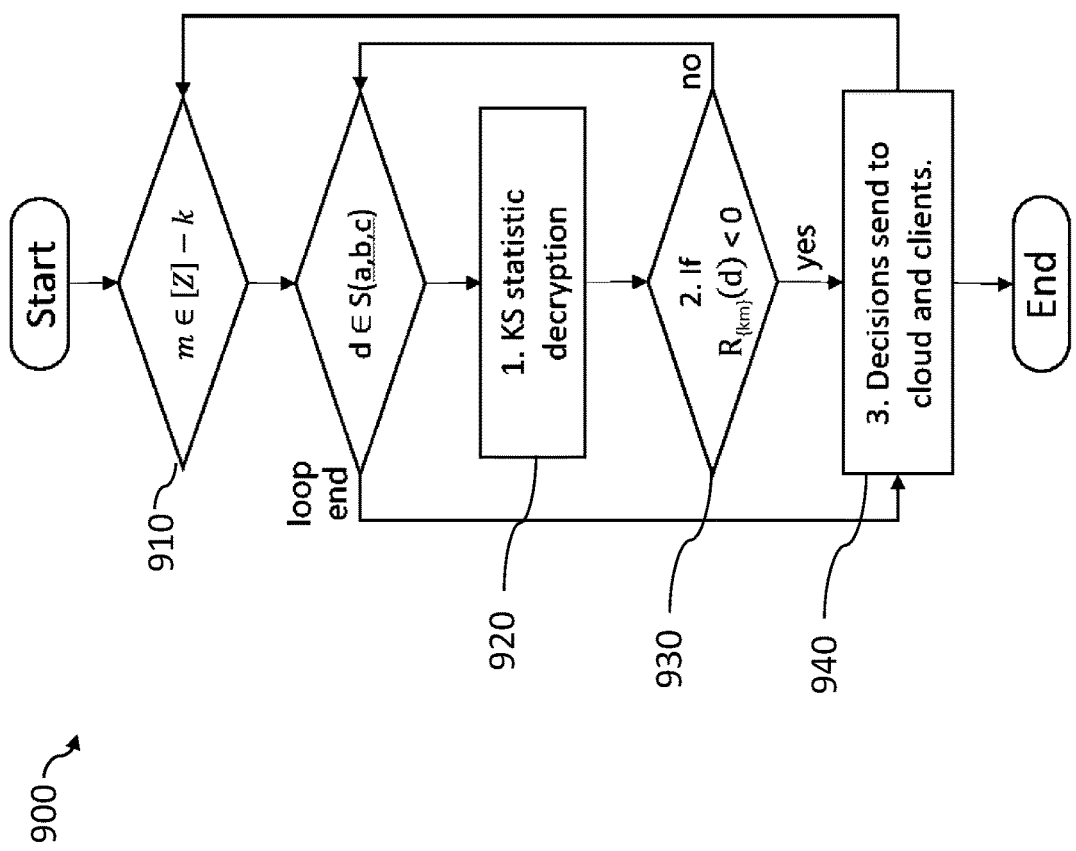
FIG. 9 illustrates a flow diagram showing operations of a method for executing the Distribution Similarity Decision Module in accordance with non-limiting embodiments of the present technology.

FIG. 8 is a block diagram of the Distribution Similarity Decision Module 800 executed by the clients to determine the distribution similarity of datasets between a pair of clients (i, j), and FIG. 9 is a flow chart of a method 900 for executing the Distribution Similarity Decision Module 800. For each pair of clients (i, j), the client i determine the decrypted statistic data {$R_{ji}$(d)|d∈ S(a, b, c)}, with respect to the other client j, which is used to perform the distribution similarity test between the datasets of client i and client j. With reference to FIG. 9, the method 900 includes causing, by the server 20 at operation 910, each client i receives Z−1 sets of encrypted statistic values {$E_{ji}$|j=[Z]−i}, for each other client j∈[Z]−i, and to locally decrypt, at operation 920, the encrypted statistic values using its private keys $pr_i$ to obtain unencrypted statistic data {$R_{ji}$(d)|d∈ S(a, b, c)}, Z being the number of clients participating in the current privacy-preserving distribution similarity test in the collaborative environment 100.

At operation 930, for each pair of clients i and j, if any value of the decrypted statistic data {$R_{ji}$(d)|d∈ S(a, b, c)} is less than 0, the distribution similarity test between a client i and client j is declared as failed. In other words, the distribution of the datasets of client i and client j is different from each other. Each non-sensitive testing point d∈ S(a, b, c) is thus iteratively tested. This comparison is performed locally by each client i for all other client j∈[Z]−i, separately. The result of the distribution similarity test between a client i and client j is denoted $O_{ji}$.

At operation 940, the server 20 receives the outputs {$O_{ji}$|j∈[Z]−i} from each client i. The server 20 may further transmit (or distribute) the outputs of all the clients to all the other clients participating in the current privacy-preserving distribution similarity test in the collaborative environment 100, and further determine the result 450 indicative of groups of clients that have same data distributions.

Broadly speaking, the privacy-preserving distribution similarity test for a pair of clients (i, j) is negative in response to all the values decrypted KS-statistic $\{R_{ji}(d)|d \in S(a, b, c)\}$ being above, or equal to 0, meaning two data distributions are statistically similar.

Figure 10A:
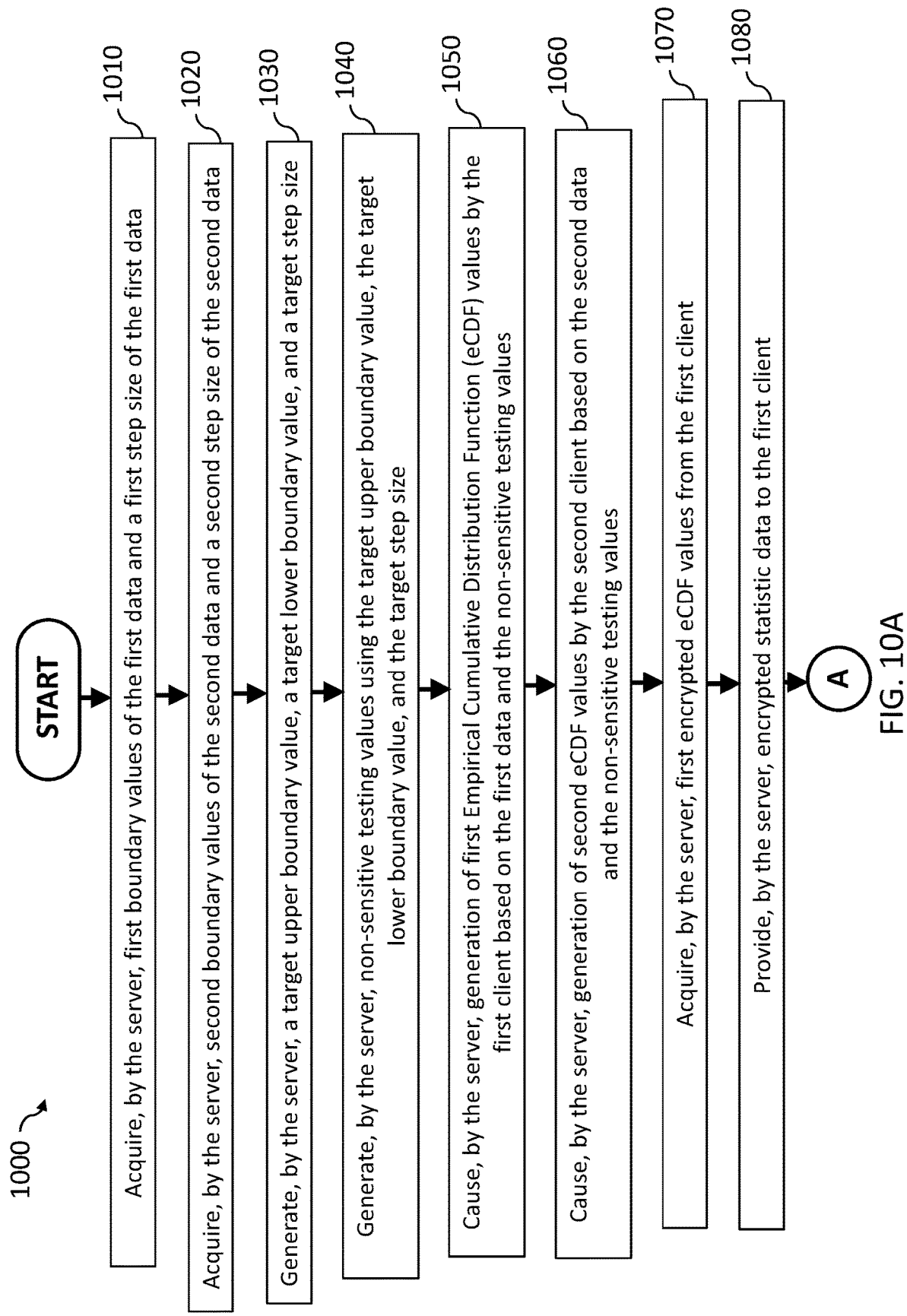
FIGS. 10A and 10B are flow charts showing operations of a method for performing a privacy-preserving distribution similarity test between a first data and a second data in accordance with a non-limiting embodiment of the present technology.
Figure 10B:
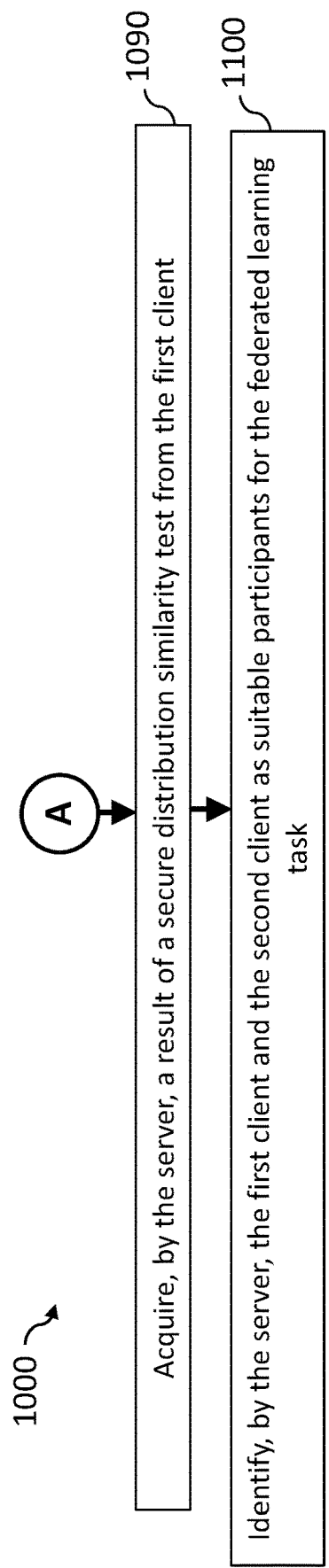

With reference to FIGS. 10A and 10B, there is depicted a method 1000 executable by a server (e.g. server 20) for performing a privacy-preserving distribution similarity test between a first data and a second data, the first data being available to a first client, the second data being available to a second client. In some implementations, the server executing the method 1000 is the second client. Various operations of the method 1000 will now be described.

The method 1000 begins with acquiring, at operation 1010 by the server, first boundary values of the first data and a first step size of the first data. In this implementation, the first boundary values and the first step size may be selected by the first user such that privacy and anonymity of the first data are preserved. For example, the first boundary values may consist of a first upper boundary value and a first lower boundary value. The first upper boundary value may be arbitrarily selected from any value which is higher than the highest value of first data. The first lower boundary value may be arbitrarily selected from any value which is lower than the lowest value of the first data. In some implementations of the method, the first boundary values are different from the lowest value of the first data and the highest value of the first data.

The method 1000 continues with acquiring, at operation 1020 by the server, second boundary values of the second data and a second step size of the second data. In this implementation, the second boundary values and the second step size may be selected by the second user such that privacy and anonymity of the second data are preserved. For example, the second boundary values may consist of a second upper boundary value and a second lower boundary value. The second upper boundary value may be arbitrarily selected from any value which is higher than the highest value of second data. The second lower boundary value may be arbitrarily selected from any value which is lower than the lowest value of the second data. In some implementations of the method, the second boundary values are different from the lowest value of the second data and the highest value of the second data.

The method 1000 continues with generating, at operation 1030 by the server, a target upper boundary value, a target lower boundary value, and a target step size. In this implementation, the target upper boundary value and the target lower boundary value are selected amongst the first boundary values and the second boundary values. Additionally, the target step size is selected amongst the first step size and the second step size. For example, in response to a and b being boundary values of the first data, and c and d being boundary values of the second data with a<c and c<b<d, the target upper boundary value may be a value larger than a and the target lower boundary value may be a value lower than d.

The method 1000 continues with generating, at operation 1040 by the server, non-sensitive testing values using the target upper boundary value, the target lower boundary value, and the target step size. For example, as per the exhaustive testing strategy, the non-sensitive testing values may be the set of values S(a, b, c) previously described. Indeed, in this implementation, the non-sensitive testing values include the target lower boundary value, the target upper boundary value, and intermediate values, the intermediate values being values between the target lower boundary value and the target upper boundary value according to the target step size.

The method 1000 continues with causing, at operation 1050 by the server, generation of first Empirical Cumulative Distribution Function (eCDF) values by the first client based on the first data and the non-sensitive testing values. The first eCDF values may be written as $$F_i(d) = \frac{1}{S_i} \sum_{l=1}^{|S_i|} 1_{[-\infty, d]}(x_l),$$

where $x_l$ is selected in S(a, b, c), $\{x_l\}$ being the ensemble of the first data.

The method 1000 continues with causing, at operation 1060 by the server, generation of second eCDF values by the second client based on the second data and the non-sensitive testing values. The second eCDF values may be written as $$F_j(d) = \frac{1}{|S_j|} \sum_{l=1}^{|S_j|} 1_{[-\infty, d]}(y_l),$$

where $y_l$ is selected in S(a, b, c), $\{y_l\}$ being the ensemble of the second data.

The method 1000 continues with acquiring, at operation 1070 by the server, first encrypted eCDF values from the first client. In this implementation, the first encrypted eCDF values has been generated by the first client using the first eCDF values $F_i(d)$ and a public key $p_i$ of the first client.

The method 1000 continues with providing, at operation 1080 by the server, encrypted statistic data to the first client, the encrypted statistic data having been generated by the second client using the first encrypted eCDF values and second encrypted eCDF values. In this implementation, the second encrypted eCDF values has been generated by the second client using the second eCDF values $F_j(d)$ and the public key $p_i$ of the first client.

The method 1000 continues with acquiring, at operation 1090 by the server, a result of a privacy-preserving distribution similarity test from the first client, the distribution similarity test having been performed by the first client based on decrypted statistics data. In this implementation, the decrypted statistic data have been generated using the encrypted statistic data and a private key $pr_i$ of the first client. In this implementation, the privacy-preserving distribution similarity test is a KS test.

The method 1000 ends with identifying, at operation 1100 by the server, the first client and the second client as suitable participants for the federated learning task.

In some implementations, the method 1000 further includes causing, by the server, execution of the federated learning task between the first and second clients.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

In one aspect, generation of the non-sensitive testing points S(a, b, c) enables the server 20 to perform the privacy-preserving distribution similarity test while maintaining privacy of the data of the clients. However, performing the privacy-preserving distribution similarity test by enumerating all data points in the sequence S(a, b, c) generated using the exhaustive testing strategy has a time-complexity that depends on the target upper boundary values, the target lower boundary values and the step-sizes receive from the clients $120_k$, which may lead to a relatively high computing time.

In another implementation, the non-sensitive testing points are generated using the smart testing strategy, that reduce a number of non-sensitive testing points to be tested, hence making the privacy-preserving distribution similarity test more computationally efficient. The smart-testing strategy may be described as follows.

Developers of the present technology have realized that, in order to conduct a privacy-preserving distribution similarity test between a first and a second clients i and j, maximum value of the difference between the first and second eCDF values have to be assessed. In other words, only the data points that locally maximizes $\text{argmax}_{d \in S_i \cup S_j} [F_i(d) - F_j(d)]$ may be identified and considered for conducting the KS test and determine whether any value in the set $R_{ji}$ is below 0. In other words, as long as the data points that locally maximizes $\text{argmax}_{d \in S_i \cup S_j} [F_i(d) - F_j(d)]$ is identified and tested, we know for sure the final test result of the KS test. Developers of the present technology have also realized that values of d which maximizes the argmax stated above, also referred to as critical points, must lie in an interval [m, n] where m belong to the first data $S_i$ and n belong to the second data $S_j$, or visa versa. In other words, boundary values of an interval [m, n] to look for the said values of d should come from different clients. In the context of the present disclosure, such an interval is referred to as a critical interval. We call this observation one. The second observation is that the value of $[F_i(d) - F_j(d)]$ remains constant in any critical interval. Hence, only one data point may be tested for every critical interval while preserving an accuracy of the privacy-preserving distribution similarity test, which can help save computation and speed up the test. Compared to the exhaustive search method, where we test all the points in S(a, b, c), the smart strategy truncate majority of the points from S(a, b, c) based on the two observations while keeps the test accurate.

Specifically, exhaustive search method traverses all data points in the whole internal [a, b] with stepsize c, provided the stepsize c is small enough so all the data from both clients are included, which improves accuracy at the cost of efficiency. On the other hand, the smart strategy splits the interval [a, b] to subintervals, whose ends points are from the union of data of the first and second client, i.e., the interval $[a, b] = \cup [d_i, d_{i+1}]$, $d_i \in S_i \cup S_j$, $d_i < d_{i+1}$. The first observation helps truncate the non-critical intervals, while the second observation helps further drop points in the critical intervals until there is only one point left in each critical interval. We call the set of the left points as critical set. The smart strategy basically is aiming at finding a relative small, compared to S(a, b, c), superset of the critical set while keeps the privacy.

Figure 11:
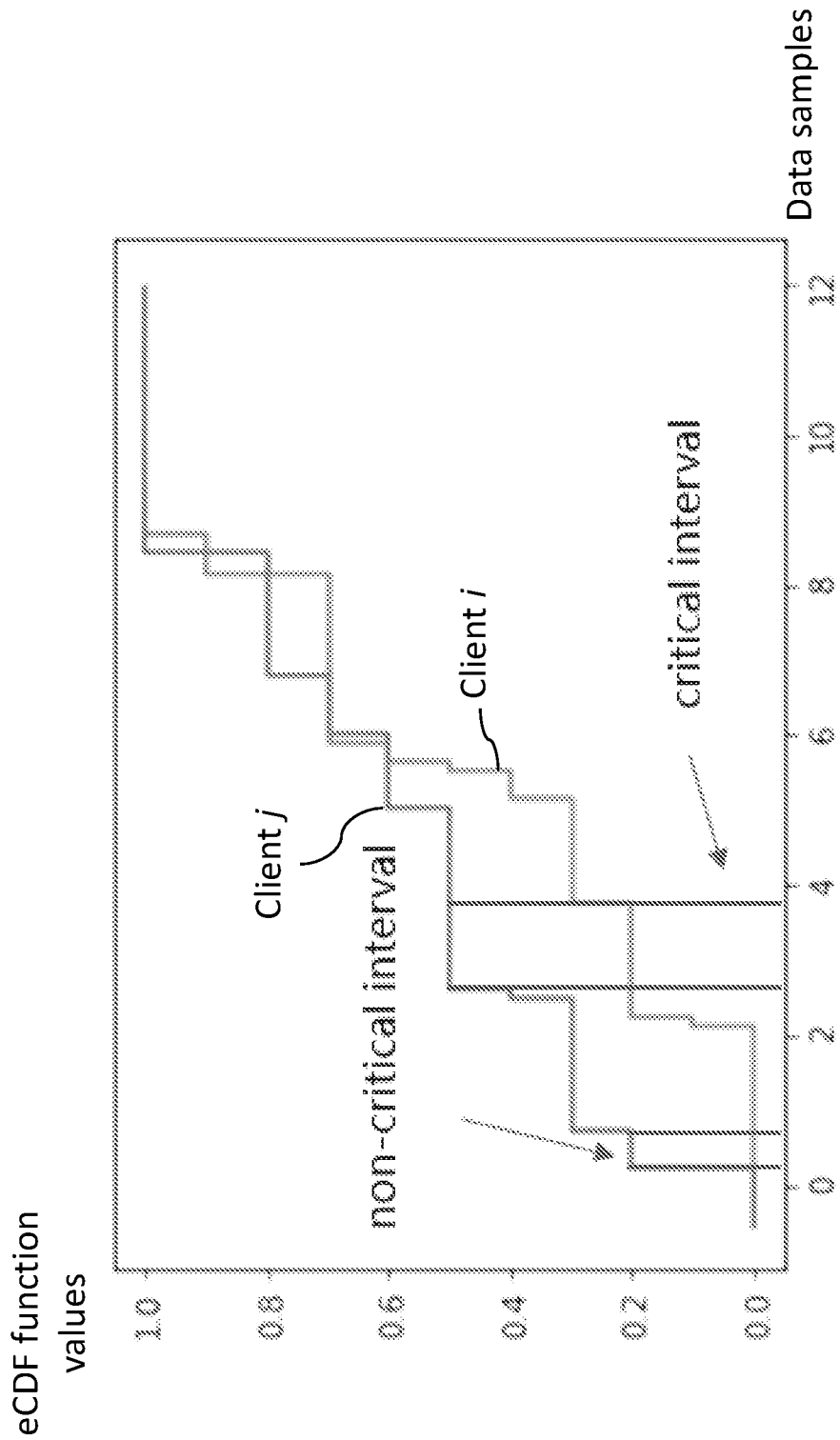
FIG. 11 is a chart of an experimental measurement showing difference between empirical Cumulative Distribution Function (eCDF) values of a first and a second client according to a number of data samples.

As an example, FIG. 11 is a chart of an experimental measurement showing an example of critical and non-critical intervals.

Based on these ideas and observations, herein proposed is a smart testing strategy which synthesizes anonymized data (non-sensitive testing points) required for KS test rather than enumerating the whole sequence S(a, b, c). The generated data which we refer to as $\tilde{G}_{ji}$ corresponding to client j and i satisfies K-anonymity definition of privacy. From client i's view; data is divided into range [a, b] based on client i's data and each $y_i \in S_j$ can appear in K different intervals.

Figure 12A:
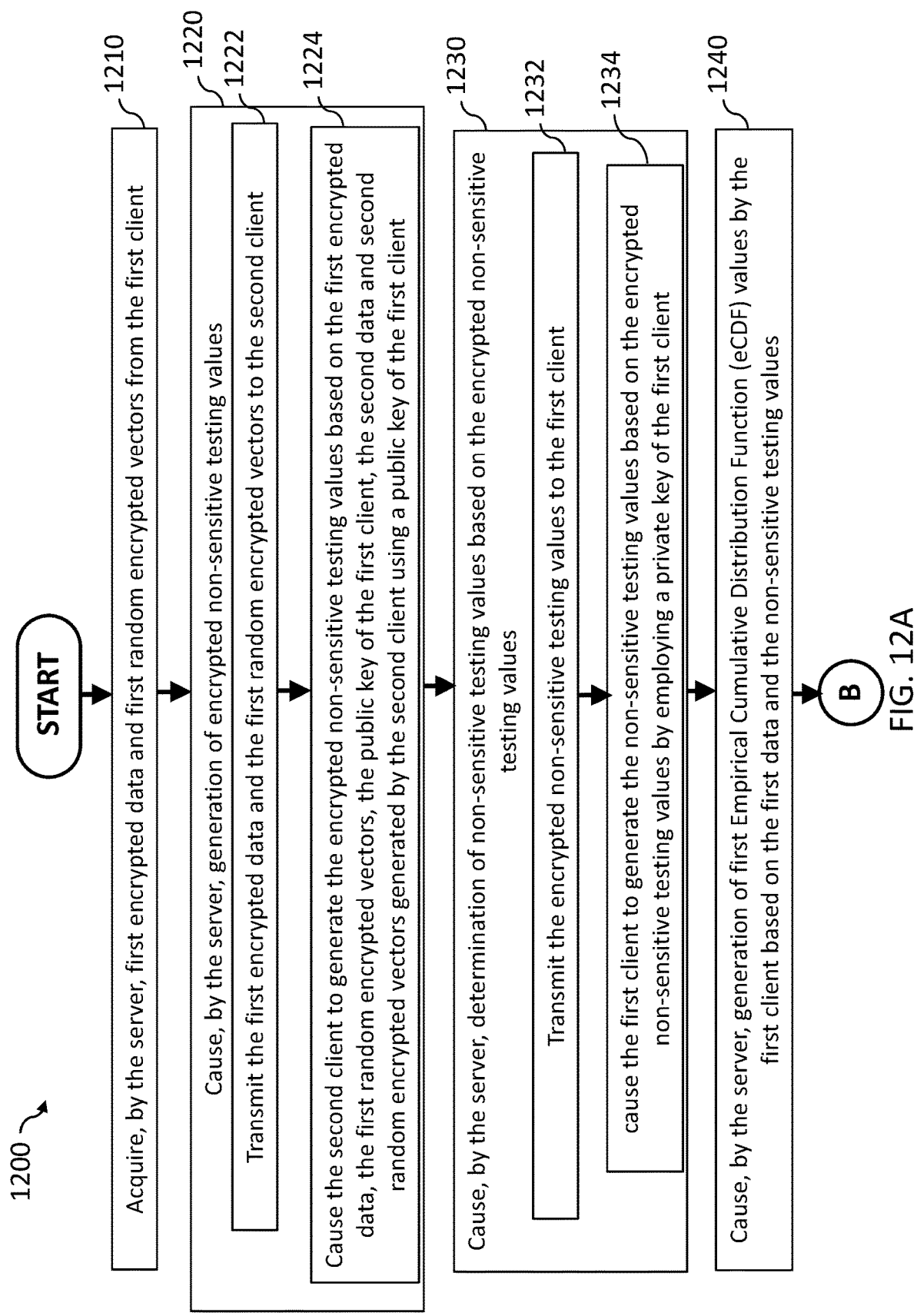
FIGS. 12A and 12B are flow charts showing operations of a method for performing a privacy-preserving distribution similarity test between a first data and a second data in accordance with another non-limiting embodiment of the present technology.
Figure 12B:
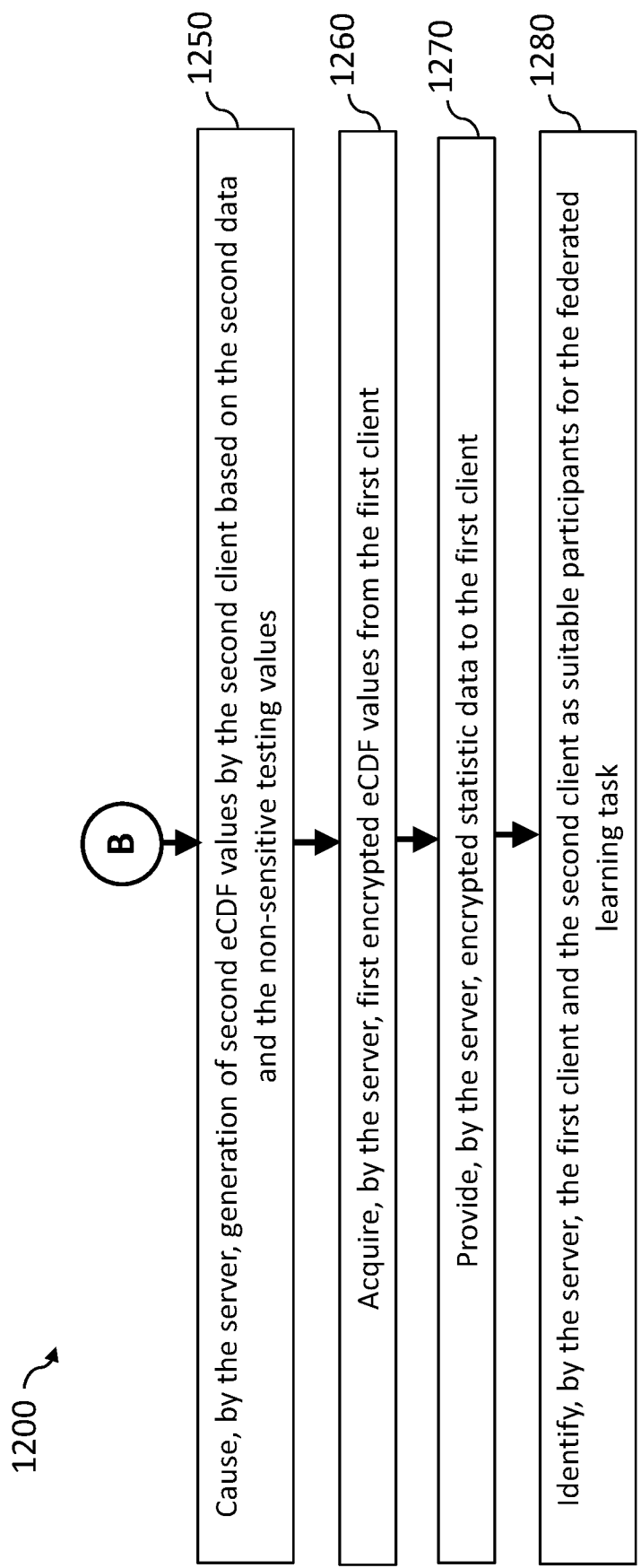

With reference to FIGS. 12A and 12B, there is depicted a method 1200 executable by a server (e.g. server 20) for performing a privacy-preserving distribution similarity test between a first data and a second data, the first data being available to a first client, the second data being available to a second client. In some implementations, the server executing the method 1200 is the second client. Various operations of the method 1200 will now be described. Broadly speaking, the method 1200 uses the smart-testing strategy to generate the non-sensitive testing points.

The method 1200 begins with acquiring, at operation 1210 by the server, first encrypted data and first random encrypted vectors from the first client, the first encrypted data being an encrypted version of the first data using a public key $p_i$ of the first client. In this implementation, first random encrypted vectors are randomly sampled vectors encrypted using the public key $p_i$ of the first client. The random encrypted vectors may be used to sample a number in the range [a, b] given that data processed in the environment 1000 is encrypted data.

The method 1200 continues with causing, at operation 1220 by the server, generation of encrypted non-sensitive testing values $\tilde{G}_{ji}$. To do so, the server transmits, in this implementation, the first encrypted data and the first random encrypted vectors to the second client j. The server further causes the second client to generate the encrypted non-sensitive testing values based on the first encrypted data, the first random encrypted vectors, the public key $p_i$ of the first client, the second data, and second random encrypted vectors generated by the second client using the public key $p_i$ of the first client.

The method 1200 continues with causing, at operation 1230 by the server, determination of decrypted non-sensitive testing values $G_{ji}$ based on the encrypted non-sensitive testing values $\tilde{G}_{ji}$. In this implementation, the server transmits the encrypted non-sensitive testing values to the first client and causes the first client to generate the non-sensitive testing values based on the encrypted non-sensitive testing values by employing a private key $pr_i$ of the first client.

Broadly speaking, instead of enumerating the whole sequence S(a, b, c) as described with respect to the exhaustive testing strategy, the smart testing strategy which synthesizes anonymized data (non-sensitive testing values) required for KS test. The generated non-sensitive testing values, which are refer to as $G_{ji}$ corresponding to first and second clients, satisfy K-anonymity definition of privacy.

More specifically, the generation of the encrypted non-sensitive testing values $\tilde{G}_{ji}$, by the second client j, in accordance with the smart testing strategy may be performed using the following pseudo-code.

---

Algorithm 1 Private data synthesis (Executed on client j)

---

Require: Inputs: public key of $i^{th}$ client $p_i$, encrypted data of $i^{th}$ client using its public key $\tilde{S}_i = \{p_i(x_1), p_i(x_2), \ldots, p_i(x_{|\tilde{S}_i|})\}$; $2K * |\tilde{S}_i|$ indicator vectors encrypted using $i^{th}$ client's public key $\{\tilde{I}_l^k\}$ where k = 1 : K and l = 1 : $|\tilde{S}_i|$, unencrypted data of $j^{th}$ client: $S_j = y_1, y_2, \ldots, y_{|S_j|}$.

-continued

| Algorithm 1 Private data synthesis (Executed on client j) |
| --- |

```
 1:  procedure CONV(x, y, a, b)          ▷ Finds an anonymous data points between x, y
 2:      t = (a + b) / 2                 ▷ Average of two random constants a, b
 3:      return t * x + (1 − t) * y
 4:  end procedure
 5:  for y_m ∈ S_j do                    ▷ Generate anonymized data points for each y_m
 6:      y_m^0 ← y_m
 7:      for k = 1 : K do                ▷ Generate K fake data points using client i data
 8:          From encrypted S̃_i, randomly sample consecutive points {p_i(x_l), p_i (x_{l+1})}
 9:          y_m^k ← Conv(p_i(x_l), p_i(x_{l+1}), β_i, β_j)
10:      end for
11:      for x_l ∈ S̃_j do                ▷ Generate (K + 1) * |S̃_i| * |S_j| anonymized data points
12:          for k = 0 : K do
13:              g_{lm}^k ← Conv(p_i(x_i), y_m^k, β_i, β_j)
14:          end for
15:      end for
16:  end for
17:  for x_l ∈ S̃_i do                    ▷ Generate anonymized data points for each x_l
18:      Set Y ← [p_i(y_1), p_i(y_2), . . . , p_i(y_{|S_j|})] and x_l^0 ← x_l
19:      for k = 1 : K do                ▷ Generate K fake data points using client j data
20:          x_l^k Conv(Y.Ĩ_i^{2k−1}, Y.Ĩ_i^{2k}, β_i, β_j)  ▷ I_j s mimic random sampling.
21:      end for
22:      for y_m ∈ S_j do                ▷ Generate (K + 1) * |S̃_i| * [|S_j|] anonymized data points
23:          for k = 0 : K do
24:              h_{lm}^k ← Conv(p_i(y_m), p_i(x_l^k), β_i, β_j)
25:          end for
26:      end for
27:  end for
28:  Final time complexity is O((K + 1) * |S̃_i| * [|S_j|)+ O((2K + 1) * |S̃_i| * [|S_j|)
29:  Output: Final anonymized data is G = {g_{lm}^k, h_{lm}^k}∀l, m, k
```

Operations described in the pseudo-code above are, in this illustrative implementation, executed by the second client (i.e. on the side of client j). In this pseudo code, $\beta_i$ is one of the random encrypted vectors generated using the public key of client i and $\beta_j$ is one of the random encrypted vectors generated using the public key of client j.

The method 1200 continues with causing, at operation 1240 by the server, generation of first eCDF values $F_i(d)$ by the first client based on the first data and the non-sensitive testing values.

The method 1200 continues with causing, at operation 1250 by the server, generation of second eCDF values $F_j(d)$ by the second client based on the second data and the non-sensitive testing values.

The method 1200 continues with acquiring, at operation 1260 by the server, first encrypted eCDF values from the first client. In this implementation, the first encrypted eCDF values $F_i(d)$ have been generated by the first client using the first eCDF values and the public key $p_i$ of the first client.

The method 1200 continues with providing, at operation 1270 by the server, encrypted statistic data to the first client, the encrypted statistic data having been generated by the second client using the first encrypted eCDF values and second encrypted eCDF values. In this implementation, the second encrypted eCDF values have been generated by the second client using the second eCDF values $F_j(d)$ and the public key $p_i$ of the first client. The specifics (equations) of computing the encrypted eCDF and statistic values are the same, as described in the document previously, in the exhaustive search method.

The method 1200 continues with acquiring, at operation 1280 by the server, a result of the distribution similarity test from the first client. In this implementation, the distribution similarity test has been performed by the first client based on decrypted statistics data, the decrypted statistic data having been generated using the encrypted statistic data and a private key of the first client. In this implementation, the privacy-preserving distribution similarity test is a KS test. In an implementation, the result of the distribution similarity test is indicative that data distributions of the first and second data are statistically similar in response to all of the unencrypted statistic data are above or equal to 0.

The method 1200 ends with identifying, at operation 1290 by the server, the first client and the second client as suitable participants for the federated learning task.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of performing a privacy-preserving distribution similarity test between a first data and a second data, the first data being available to a first client, the second data being available to a second client, the method executable by a server, the method comprising:

acquiring, by the server, first boundary values of the first data and a first step size of the first data;

acquiring, by the server, second boundary values of the second data and a second step size of the second data;

generating, by the server, a target upper boundary value, a target lower boundary value, and a target step size, the target upper boundary value and the target lower boundary value being selected amongst the first boundary values and the second boundary values, the target step size being selected amongst the first step size and the second step size;

generating, by the server, non-sensitive testing values using the target upper boundary value, the target lower boundary value, and the target step size, the non-sensitive testing values including the target lower boundary value, the target upper boundary value, and intermediate values, the intermediate values being values between the target lower boundary value and the target upper boundary value according to the target step size;

causing, by the server, generation of first Empirical Cumulative Distribution Function (eCDF) values by the first client based on the first data and the non-sensitive testing values;

causing, by the server, generation of second eCDF values by the second client based on the second data and the non-sensitive testing values;

acquiring, by the server, first encrypted eCDF values from the first client, the first encrypted eCDF values having been generated by the first client using the first eCDF values and a public key of the first client;

providing, by the server, encrypted statistic data to the first client, the encrypted statistic data having been generated by the second client using the first encrypted eCDF values and second encrypted eCDF values, the second encrypted eCDF values having been generated by the second client using the second eCDF values and the public key of the first client; and acquiring, by the server, a result of the privacy-preserving distribution similarity test from the first client, the distribution similarity test having been performed by the first client based on decrypted statistics data, the decrypted statistic data having been generated using the encrypted statistic data and a private key of the first client.

2. The method of claim 1, wherein the first boundary values comprise a first upper boundary value and a first lower boundary value, the first upper boundary value being arbitrarily selected by the first client from any value which is higher than a highest value of the first data, the first lower boundary value being arbitrarily selected by the first client from any value which is lower than a lowest value of the first data.

3. The method of claim 1, wherein the first boundary values are different from a lowest value from the first data and a highest value form the first data.

4. The method of claim 1, further comprising:

identifying, by the server, the first client and the second client as suitable participants for a federated learning task; and causing, by the server, execution of the federated learning task between the first and second clients.

5. The method of claim 1, wherein the server is the second client.

6. The method of claim 1, wherein the first and second clients respectively transmit a first significance level and a second significance level to the server.

7. The method of claim 1, further comprising:

transmitting the public key of the first client to the second client; and transmitting the public key of the second client to the first client.

8. A method performing a privacy-preserving distribution similarity test between a first data and a second data, the first data being available to a first client, the second data being available to a second client, the method executable by a server, the method comprising:

acquiring, by the server, first encrypted data and first random encrypted vectors from the first client; the first encrypted data being an encrypted version of the first data using a public key of the first client;

causing, by the server, generation of encrypted non-sensitive testing values by:

transmitting the first encrypted data and the first random encrypted vectors to the second client; and causing the second client to generate the encrypted non-sensitive testing values based on the first encrypted data, the first random encrypted vectors, the public key of the first client, the second data and second random encrypted vectors generated by the second client using a public key of the first client;

causing, by the server, determination of non-sensitive testing values based on the encrypted non-sensitive testing values by:

transmitting the encrypted non-sensitive testing values to the first client;

causing the first client to generate the non-sensitive testing values based on the encrypted non-sensitive testing values by employing a private key of the first client;

causing, by the server, generation of first Empirical Cumulative Distribution Function (eCDF) values by the first client based on the first data and the non-sensitive testing values;

causing, by the server, generation of second eCDF values by the second client based on the second data and the non-sensitive testing values;

acquiring, by the server, first encrypted eCDF values from the first client, the first encrypted eCDF values having been generated by the first client using the first eCDF values and the public key of the first client;

providing, by the server, encrypted statistic data to the first client, the encrypted statistic data having been generated by the second client using the first encrypted eCDF values and second encrypted eCDF values, the second encrypted eCDF values having been generated by the second client using the second eCDF values and the public key of the first client; and acquiring, by the server, a result of the privacy-preserving distribution similarity test from the first client, the distribution similarity test having been performed by the first client based on decrypted statistics data, the decrypted statistic data having been generated using the encrypted statistic data and a private key of the first client.

9. The method of claim 8, wherein the first random encrypted vectors are randomly sampled vectors encrypted using the public key of the first client.

10. The method of claim 8, wherein the first and second clients respectively transmit a first significance level and a second significance level to the server.

11. The method of claim 8, further comprising:
transmitting the public key of the first client to the second client; and
transmitting the public key of the second client to the first client.

12. A system for performing a privacy-preserving distribution similarity test between a first data and a second data, the first data being available to a first client, the second data being available to a second client, the system comprising:
a processor;
a memory configured to store instructions which, upon being executed by the processor, cause the processor to:
acquire first boundary values of the first data and a first step size of the first data;
acquire second boundary values of the second data and a second step size of the second data;
generate a target upper boundary value, a target lower boundary value, and a target step size,
the target upper boundary value and the target lower boundary value being selected amongst the first boundary values and the second boundary values,
the target step size being selected amongst the first step size and the second step size;
generate non-sensitive testing values using the target upper boundary value, the target lower boundary value, and the target step size,
the non-sensitive testing values including the target lower boundary value, the target upper boundary value, and intermediate values,
the intermediate values being values between the target lower boundary value and the target upper boundary value according to the target step size;
cause generation of first Empirical Cumulative Distribution Function (eCDF) values by the first client based on the first data and the non-sensitive testing values;
cause generation of second eCDF values by the second client based on the second data and the non-sensitive testing values;
acquire first encrypted eCDF values from the first client,
the first encrypted eCDF values having been generated by the first client using the first eCDF values and a public key of the first client;
provide encrypted statistic data to the first client,
the encrypted statistic data having been generated by the second client using the first encrypted eCDF values and second encrypted eCDF values,
the second encrypted eCDF values having been generated by the second client using the second eCDF values and the public key of the first client; and
acquire a result of the privacy-preserving distribution similarity test from the first client,
the distribution similarity test having been performed by the first client based on decrypted statistics data,
the decrypted statistic data having been generated using the encrypted statistic data and a private key of the first client.

13. The system of claim 12, wherein the first boundary values comprise a first upper boundary value and a first lower boundary value, the first upper boundary value being arbitrarily selected by the first client from any value which is higher than a highest value of the first data, the first lower boundary value being arbitrarily selected by the first client from any value which is lower than a lowest value of the first data.

14. The system of claim 12, wherein the first boundary values are different from a lowest value from the first data and a highest value form the first data.

15. The system of claim 12, wherein the processor is further configured to:
identify the first client and the second client as suitable participants for a federated learning task; and
cause execution of the federated learning task between the first and second clients.

16. The system of claim 12, wherein the processor is the second client.

17. A system for performing a privacy-preserving distribution similarity test between a first data and a second data, the first data being available to a first client, the second data being available to a second client, the system comprising:
a processor;
a memory configured to store instructions which, upon being executed by the processor, cause the processor to:
acquire first encrypted data and first random encrypted vectors from the first client; the first encrypted data being an encrypted version of the first data using a public key of the first client;
cause generation of encrypted non-sensitive testing values by:
transmitting the first encrypted data and the first random encrypted vectors to the second client; and
causing the second client to generate the encrypted non-sensitive testing values based on the first encrypted data, the first random encrypted vectors, the public key of the first client, the second data and second random encrypted vectors generated by the second client using a public key of the first client;
cause determination of non-sensitive testing values based on the encrypted non-sensitive testing values by:
transmitting the encrypted non-sensitive testing values to the first client;
cause the first client to generate the non-sensitive testing values based on the encrypted non-sensitive testing values by employing a private key of the first client;
cause generation of first Empirical Cumulative Distribution Function (eCDF) values by the first client based on the first data and the non-sensitive testing values;
cause generation of second eCDF values by the second client based on the second data and the non-sensitive testing values;
acquire first encrypted eCDF values from the first client,
the first encrypted eCDF values having been generated by the first client using the first eCDF values and the public key of the first client;
provide encrypted statistic data to the first client,
the encrypted statistic data having been generated by the second client using the first encrypted eCDF values and second encrypted eCDF values,
the second encrypted eCDF values having been generated by the second client using the second eCDF values and the public key of the first client; and
acquire a result of the privacy-preserving distribution similarity test from the first client, the distribution similarity test having been performed by the first client based on decrypted statistics data, the decrypted statistic data having been generated using the encrypted statistic data and a private key of the first client.

18. The system of claim 17, wherein the first random encrypted vectors are randomly sampled vectors encrypted using the public key of the first client.

* * * * *